United States Patent [19]
Seppälä et al.

[11] Patent Number: 6,087,465
[45] Date of Patent: Jul. 11, 2000

[54] MELT-PROCESSIBLE POLY (ESTER URETHANE) AND A PROCESS FOR THE PREPARATION THEREOF

[75] Inventors: Jukka Seppälä, Helsinki; Mika Härkönen, Vantaa; Kari Hiltunen, Helsinki; Minna Malin, Helsinki; Janne Kylmä, Helsinki, all of Finland

[73] Assignees: Valtion Teknillinen Tutkimuskeskus; Neste Oy, both of Espoo, Finland

[21] Appl. No.: 08/765,402

[22] PCT Filed: Jul. 7, 1995

[86] PCT No.: PCT/FI95/00396

§ 371 Date: Jan. 31, 1997

§ 102(e) Date: Jan. 31, 1997

[87] PCT Pub. No.: WO96/01863

PCT Pub. Date: Jan. 25, 1996

[30] Foreign Application Priority Data

Jul. 7, 1994 [FI] Finland ..................................... 943250

[51] Int. Cl.⁷ ................................................... C08G 18/42
[52] U.S. Cl. .............................................. 528/80; 525/450
[58] Field of Search ...................... 528/80, 361; 525/450, 525/415

[56] References Cited

U.S. PATENT DOCUMENTS

| | | | |
|---|---|---|---|
| 3,658,761 | 4/1972 | Hostettler et al. | 525/450 |
| 5,324,556 | 6/1994 | Hino | 528/272 |
| 5,380,813 | 1/1995 | Seppälä et al. | 528/58 |
| 5,470,944 | 11/1995 | Bonsignore | 528/354 |

FOREIGN PATENT DOCUMENTS

| | | |
|---|---|---|
| A20565235 | 10/1993 | European Pat. Off. . |
| 5148352 | 6/1993 | Japan . |

OTHER PUBLICATIONS

H. Fukuyaki et al; Synthesis pf Biodegradable Copoly (Lactic Acid laromatic Hydroxyacids); European Polymer Journal; 1990; vol. 26, N. 12 pp. 1273–1277 (Abstract).
English Language Translation of Japanese Reference 5148352, Jun., 1993.
Chemical Abstracts No. 116:236374 (Jun. 15, 1992).

*Primary Examiner*—Rachel Gorr
*Attorney, Agent, or Firm*—Birch, Stewart, Kolasch & Birch, LLP

[57] ABSTRACT

The invention concerns a novel melt-processible poly(ester urethane) and a process and a prepolymer for the preparation thereof. The poly(ester urethane) contains structural units derived from a polyester and structural units derived from a diisocyanate and, according to the invention, the bonds between the structural units are at least mainly comprised of urethane bonds, the number average molar mass, $M_n$, of the prepolymer is at least 10,000 g/mol, its mass-average molar mass, $M_w$, is over 20,000 g/mol and its molar mass distribution, expressed as the ratio of $M_w/M_n$, is over 2, and the prepolymer is essentially free from free isocyanate groups. The poly(ester urethane) is hydrolytically decomposable and it can be used as a biodegradable polymer, e.g., for manufacturing injection molded pieces and thermoformed and blow molded packages, bags, sacks and bottles, for coating of sacks, bags and films made of paper or cardboard, and for manufacturing fibers and non-woven fabrics.

40 Claims, 13 Drawing Sheets

Fig. 10  Glass transition temperatures of (LLA/MA) copolymers as a function of the amount of mandelic acid Fig. 11  Biodegradation at +25 °C Fig. 12  Biodegradation at +60 °C

MELT-PROCESSIBLE POLY (ESTER URETHANE) AND A PROCESS FOR THE PREPARATION THEREOF

The present invention relates to a melt-processible poly (ester urethane), which contains structural units derived from a polyester and structural units derived from a diisocyanate. Such a polymer contains prepolymer-units derived from a polyester and units derived from diisocyanate.

The invention also relates to a prepolymer according used for the preparation of melt-processible poly(ester urethane)s, which is suitable for the preparation of a poly (ester urethane) according to the present invention, and to a process for preparing a poly(ester urethane). According such a process a lower molecular weight polyester-prepolymer is first formed from hydroxy acid monomers, and then the prepolymer is copolymerized with a monomer containing isocyanate groups in order to form a poly(ester urethane).

Numerous solutions for preparing biodegradable polymers from condensation polymers of lactic acid and from isocyanates are known from the patent literature. The isocyanate works as a coupling group, which joins together the chains of the condensation polymer by means of amide and urethane bonds to form a poly(ester urethane).

JP Published Patent Application No. 05148352 discloses a poly(ester urethane) (PEU), which has been prepared from polylactide (100 parts; $M_n$>4000 g/mol). The polylactide is reacted in melt with a 0.1 to 5 parts of a diisocyanate. Diol- and diacid-based poly(ester urethane)s have been described also in the European Published Patent Application No. 0 488 617. Biodegradable poly(ester urethane)s based on lactic acid are anticipated by JP Published Patent Application No. 04013710, according to which the chain ends of a hydroxyl-terminated condensation polymer are coupled with aliphatic polyisocyanates. A similar coupling process is described in SU Patent Specification No. 1 016 314, in which lactic acid is used as one component of a hydroxyl-terminated prepolymer. In addition to the prepolymer both a diisocyanate and a diol are used for coupling.

FI Patent Application No. 924699 describes a process for preparing a lactic acid-based polyurethane. According to the process the polymer is prepared in two steps by first polymerizing the lactic acid to form an oligomer, and then copolymerizing the oligomer with isocyanate to form a polyurethane.

The known preparation processes are hampered by, for example, the problem that it is not possible to any substantial extent to influence the molar mass distribution, long-chain branching or degree of cross linking. However, these properties are important for improving the processibility of the polymer and for improving the mechanical properties and heat resistance of the polymer.

It is an object of the present invention to solve the problems relating to the prior art and to provide novel biodegradable poly(ester urethane)s, which are melt-processible and which can therefore easily be formed into the desired shape.

The solution according to the invention is based on the concept of preparing a poly(ester urethane) from a hydroxyl-terminated poly(lactic acid)-prepolymer. Said prepolymer is reacted with a diisocyanate in order to provide a polymer, in which the bonds between the prepolymer and the isocyanate are at least mainly (and in practice almost completely) formed by urethane bonds. By continuing polymerization at least for some time after the point of time when principally all free end groups have reacted with the diisocyanate, i.e. when the polymer does not contain any appreciable amounts of free hydroxyl groups and there are isocyanate groups primarily only at the ends of the polymer chains, long-chain branching of the polymer is achieved, which improves the melt-processing properties as well as the mechanical properties of the polymer. Long-chain branching occurs as a result of reactions between the polymer chains, for example as a result of reaction between the urethane bond and the isocyanate group at the end of the polymer chain.

The number average molar mass, $M_n$, of the novel polymer is at least 10,000 g/mol and its weight average molar mass, $M_w$, is over 20,000 g/mol and its molar mass distribution expressed by the ratio $M_w/M_n$ is over 2. Preferably the number average molar mass is 10,000–200,000 g/mol, in particular about 15,000–100,000, the weight average molar mass is 20,000–1,000,000, in particular about 30,000–600,000 and its molar mass distribution is 2–20, preferably 3–12.

More specifically, the polymer according to the present invention is characterized in that the bonds between the structural units are at least substantially only urethane bonds, the number average molar mass, Mn, of the polymer is at least 10,000 g/mol, its weight average molar mass, Mw, is over 20,000 g/mol and its molar mass ratio, expressed as Mw/Mn is over 2, and the polymer is essentially free from free isocyanate groups.

The polyester-prepolymer according to the invention comprises structural units derived from aliphatic and/or aromatic hydroxy acids and an organic diol, which units are coupled together so that the terminal groups of the polyester at least substantially are formed by hydroxyl groups. Preferably there is one diol unit, which is located in the middle of the prepolymer, a hydroxy acid polymer unit being attached to both hydroxyl groups via their oxygen atoms. In order to achieve long-chain branching of the poly(ester urethane) the number average molar mass of the polyester should be relatively small, typically 500–20,000, preferably about 1,000–8,000 g/mol. The lactone content of the prepolymer is less than 10 wt-% and the content of free hydroxy acid (e.g. lactic acid) is less than 10 wt-%. The acid number is low.

More specifically, the polymer according to the present invention is characterized in that it comprises structural units derived from a hydroxy acid and an organic diol, which are coupled in such a way that the terminal groups of the polyester at least substantially consist of hydroxy groups, the number average molar mass of the polyester is 500–20,000, its lactide content is less than 10 wt-% and its content of free lactic acid is less than 10 wt-%.

The process according to the invention is again characterized in that in order to provide the polyester-prepolymer with hydroxyl terminal groups the hydroxy acid monomer is copolymerized with a diol, the hydroxy terminated polyester-prepolymer is copolymerized with diisocyanate, and copolymerization is continued until a poly(ester urethane) is achieved which is at least essentially free from free isocyanate groups.

As mentioned above, a hydroxyl-terminated polyester-prepolymer, in the following also called a "hydroxy acid oligomer", is used in connection with the present invention. The reaction of this prepolymer directly with diisocyanate will provide a poly(ester urethane) (PEU), with very good properties:

the polymer is biodegradable (that is, it decomposes in biological environment typically under the influence of microorganisms) and it can be composted, the mechanical properties of the polymer are even better those of PLLA, as a plastic, it is similar to polystyrene, but stronger, the polymer is thermoplastically processible, the raw material costs are very close to the price of the hydroxy acid, because the hydroxy acid stands for some 95 mol-% of the total yield of the PEU and the other main reactant used, the isocyanate is inexpensive, the hydroxy acids, such as the lactic acid, can be prepared from renewable raw materials, for instance by fermentation, and the raw material does not have to be purified but a crude product can be used for polyesterification, and the urethane bonds of the poly(ester urethane) improve the heat resistance of the product and the processibility thereof.

For the purpose of the present invention, the terms "structural unit derived from a polyester" and "prepolymer unit" are interchangeably used as synonyms and they mean residues derived from the hydroxyl-terminated polyester of the poly(ester urethane). "Structural units derived from diisocyanate" means units which link together the prepolymer units and which are derived from the diisocyanate used for coupling of the prepolymer.

In the following the invention will be examined more closely with the aid of a detailed description and with reference to a number of working examples. The description and the examples refer to the attached drawings, of which FIG. 1 depicts the molar mass distributions of poly(L-lactic acid) and of hydroxyl-terminated poly(L-lactic acid), respectively;

Figure 5:
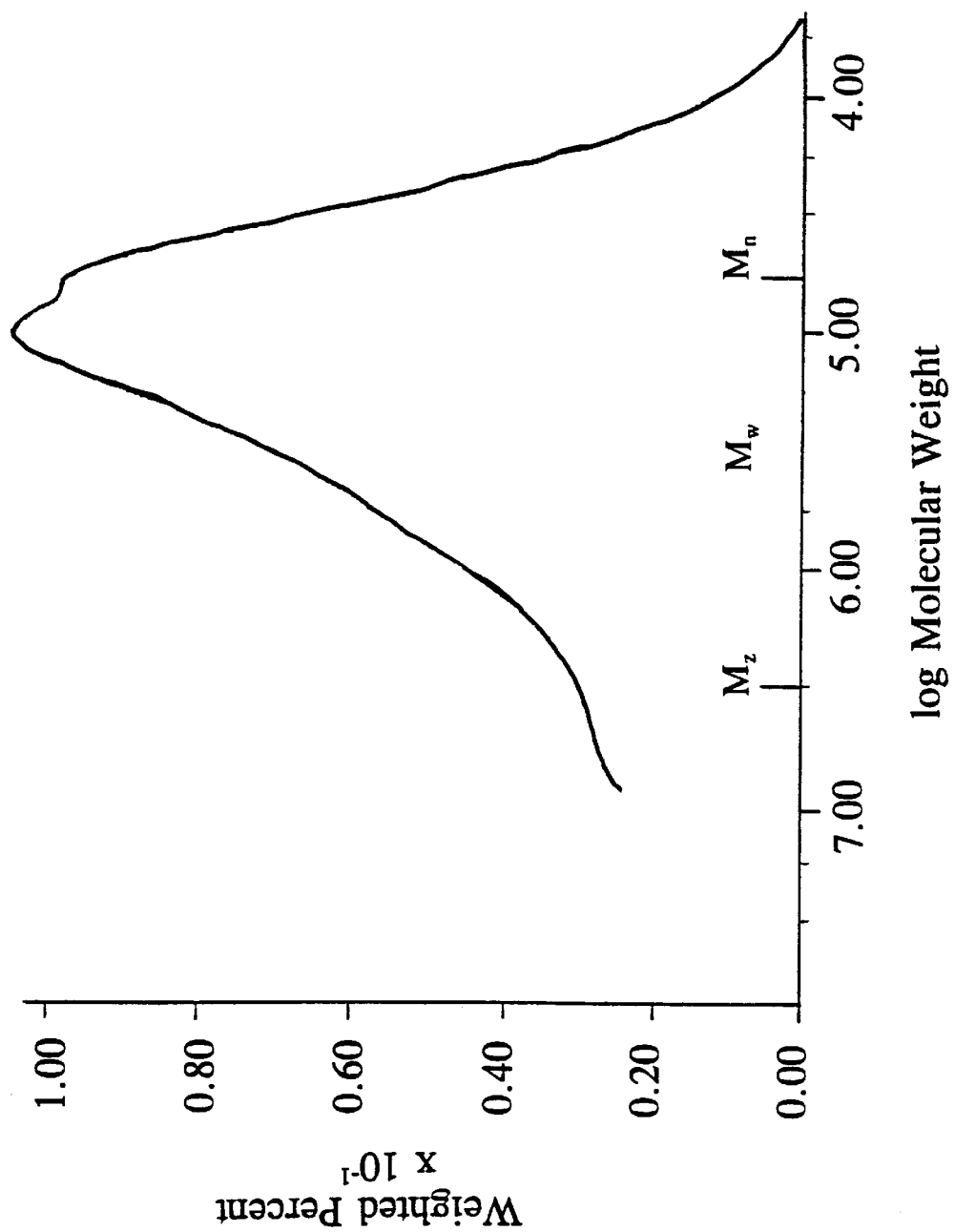
Figure 6:
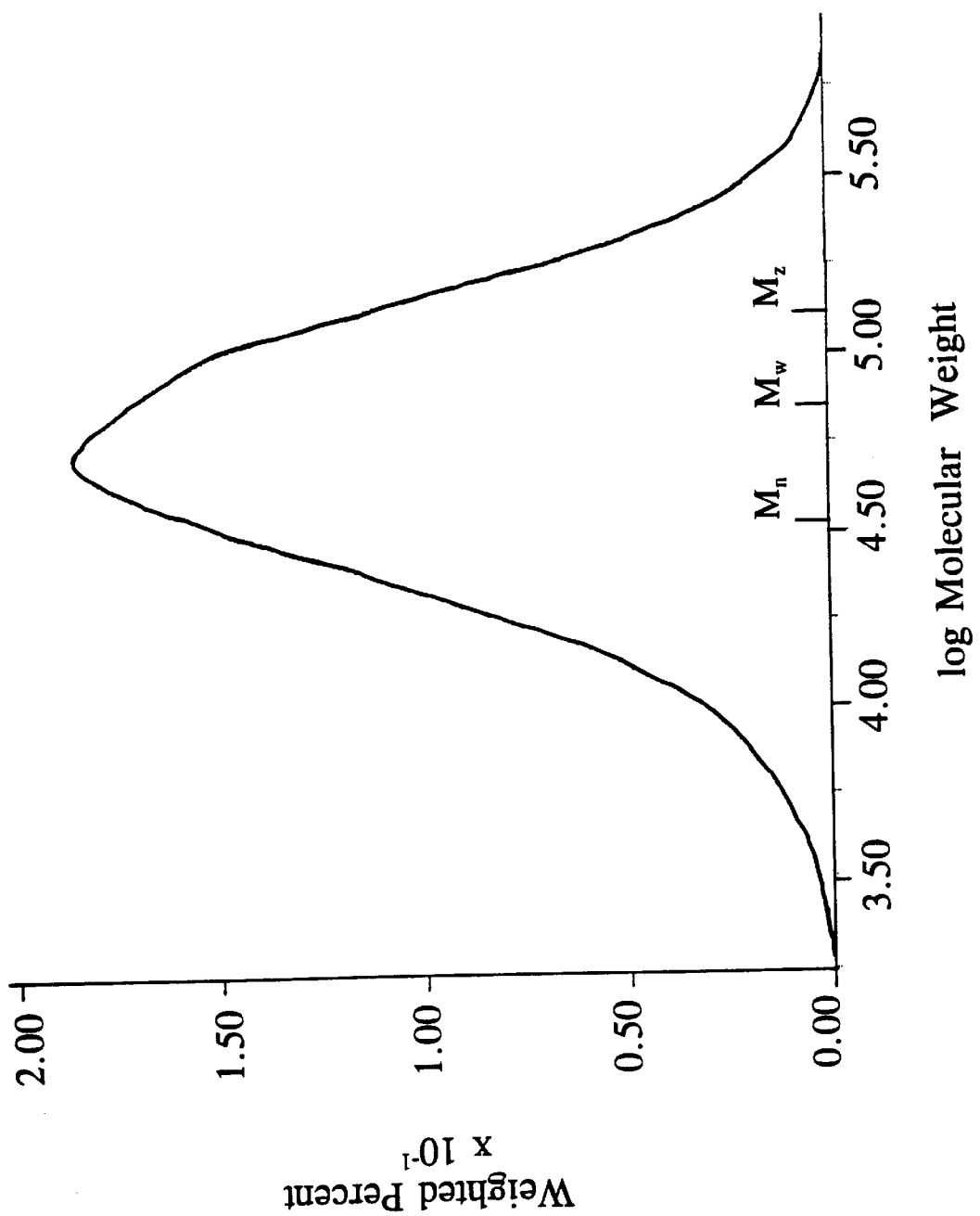
Figure 7:
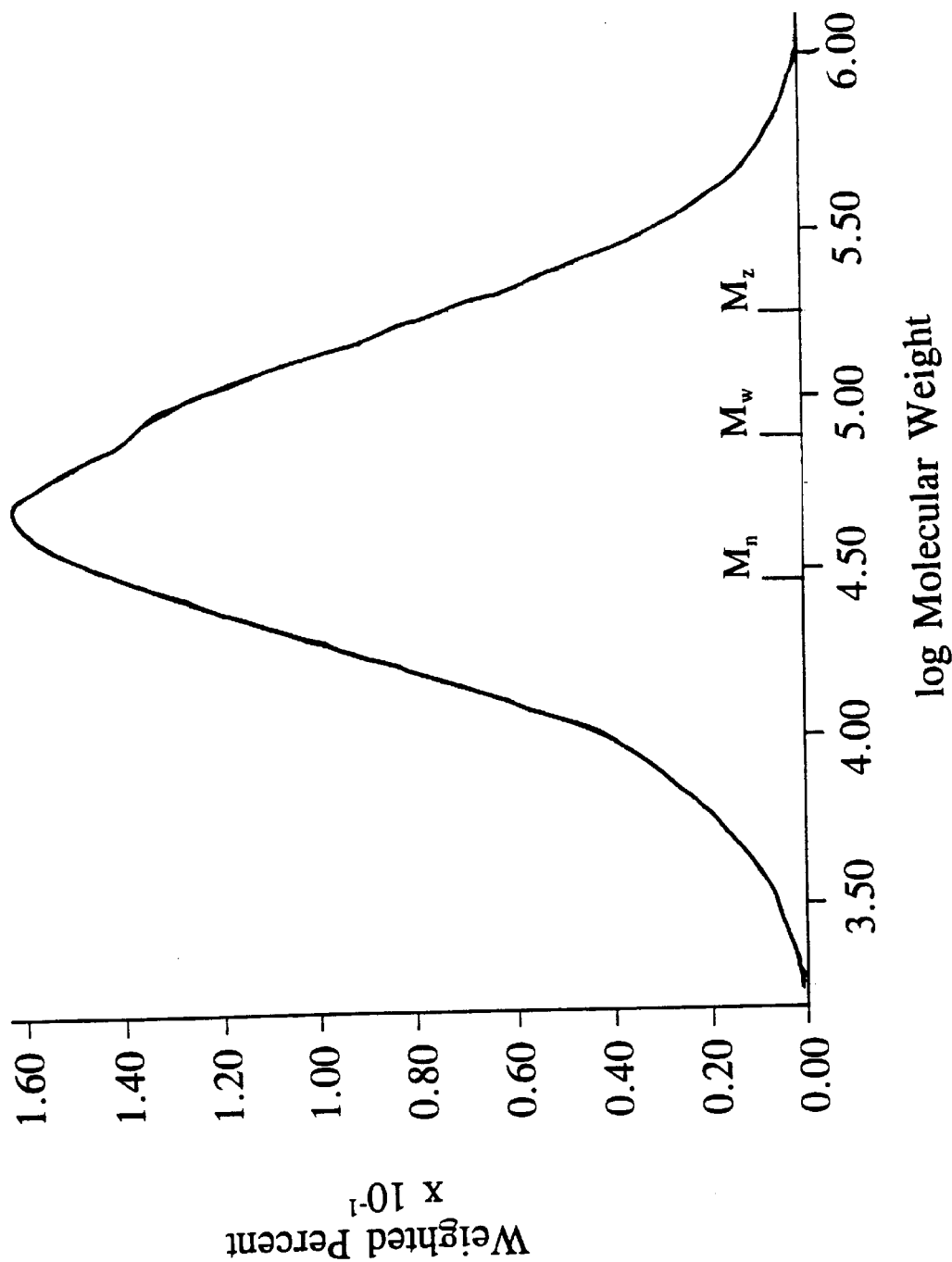
Figure 8:
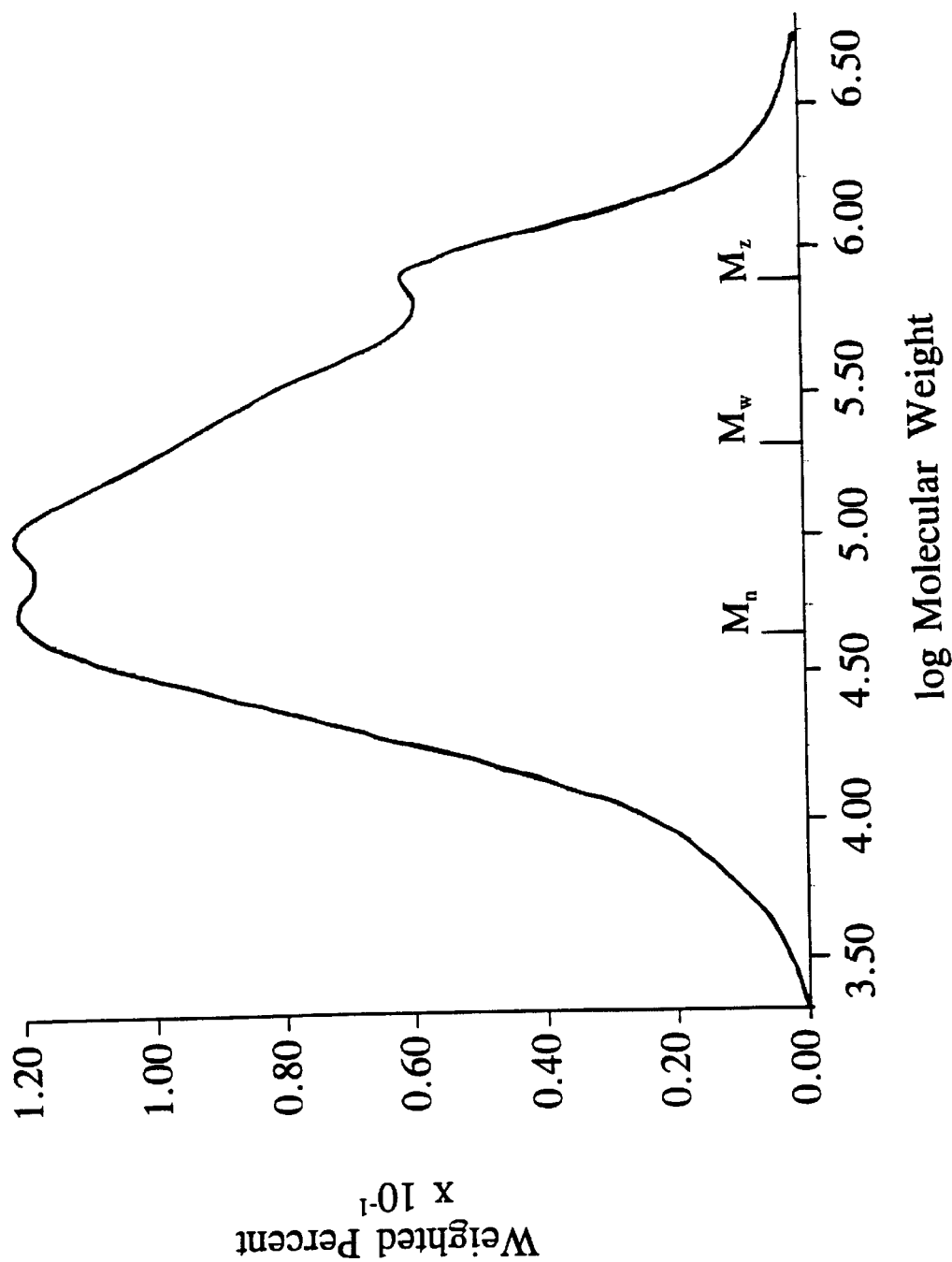
Figure 9:
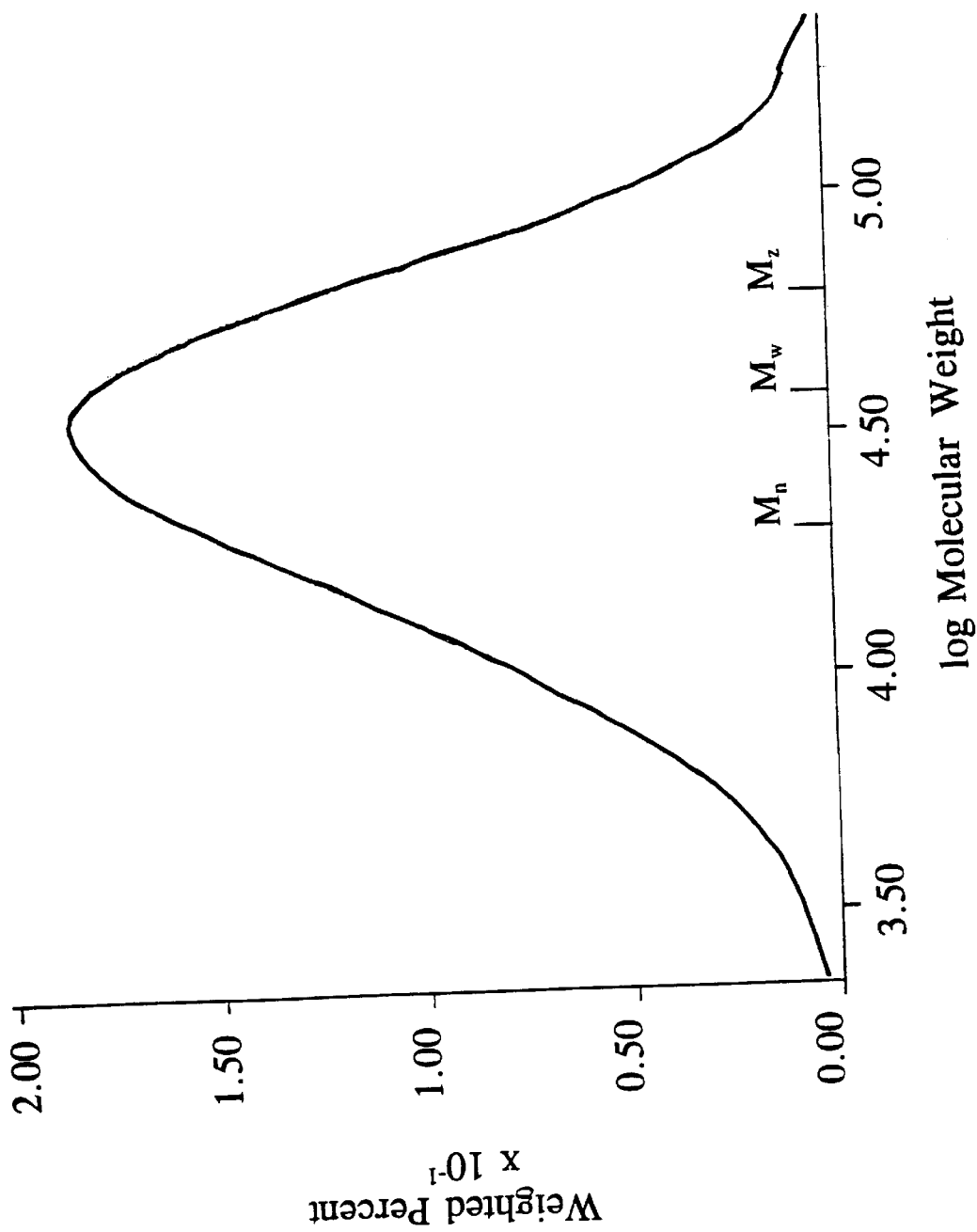
Figure 10:
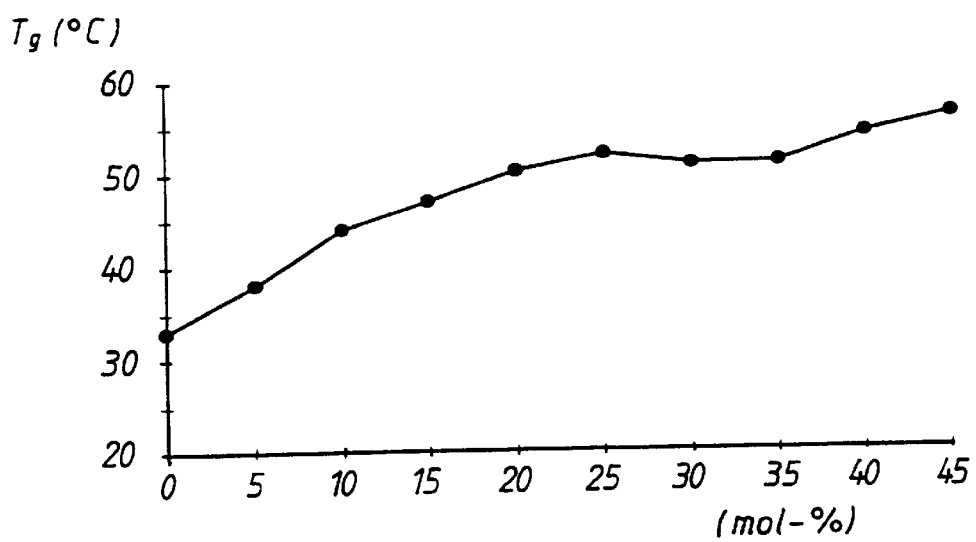
Figure 11:
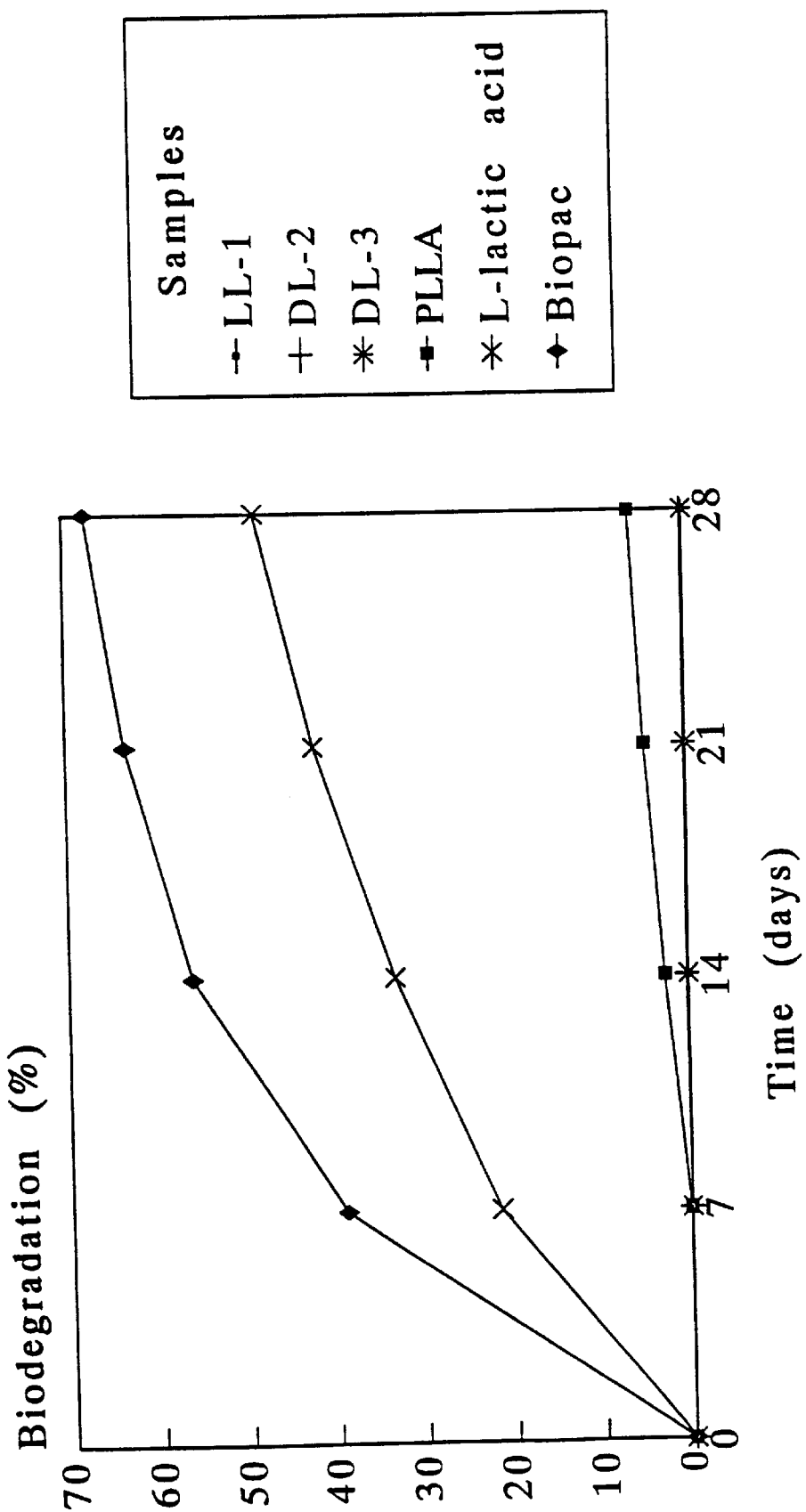
Figure 12:
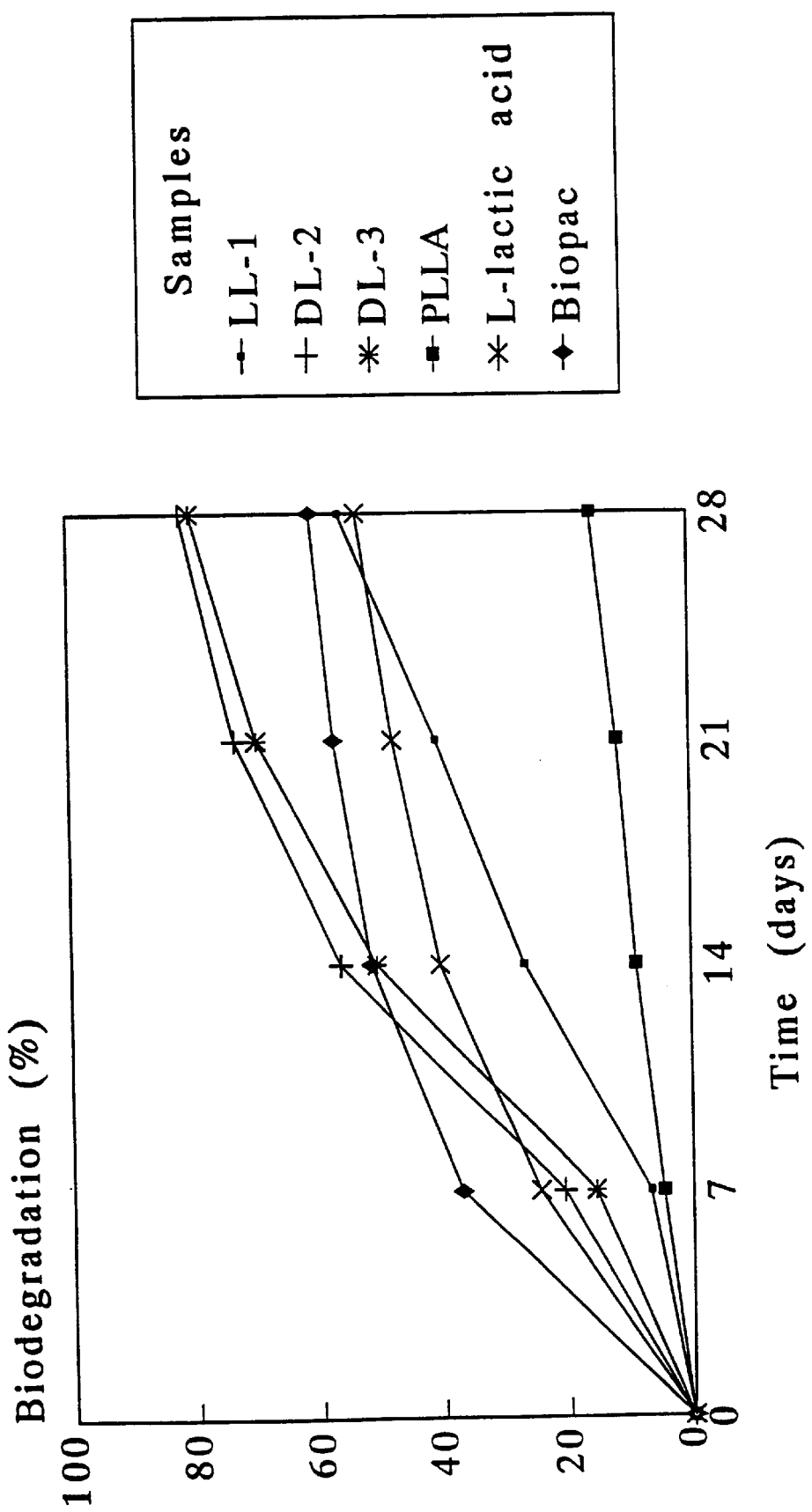
Figure 13:
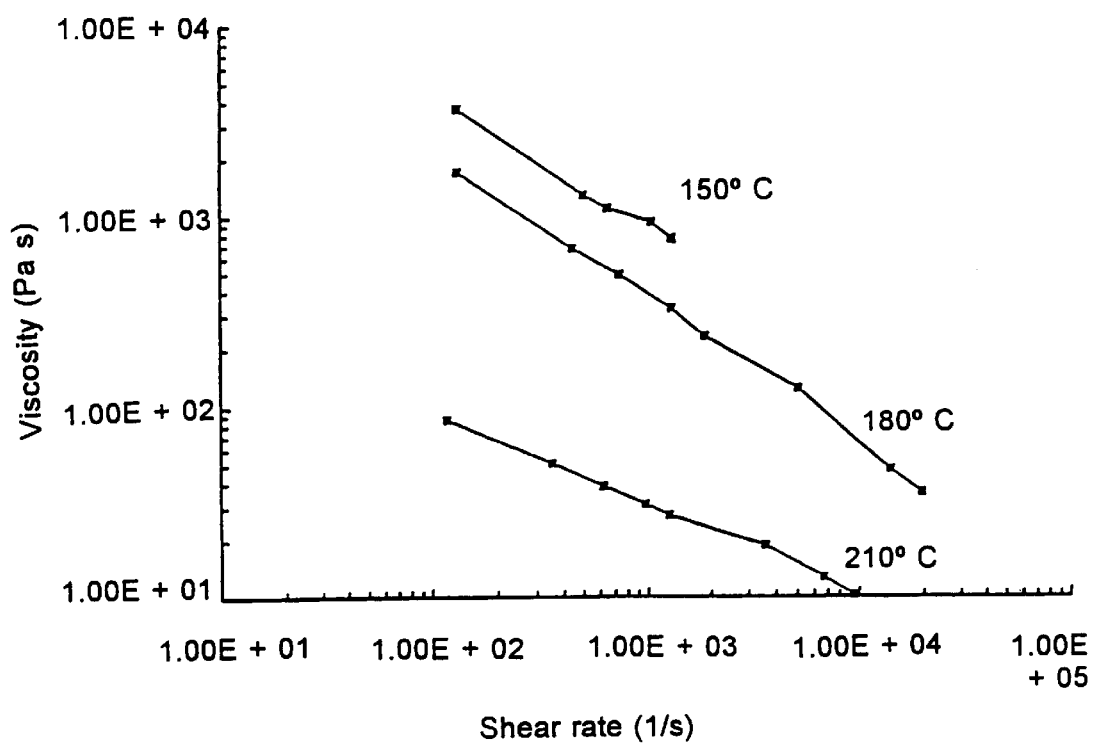
Figure 14:
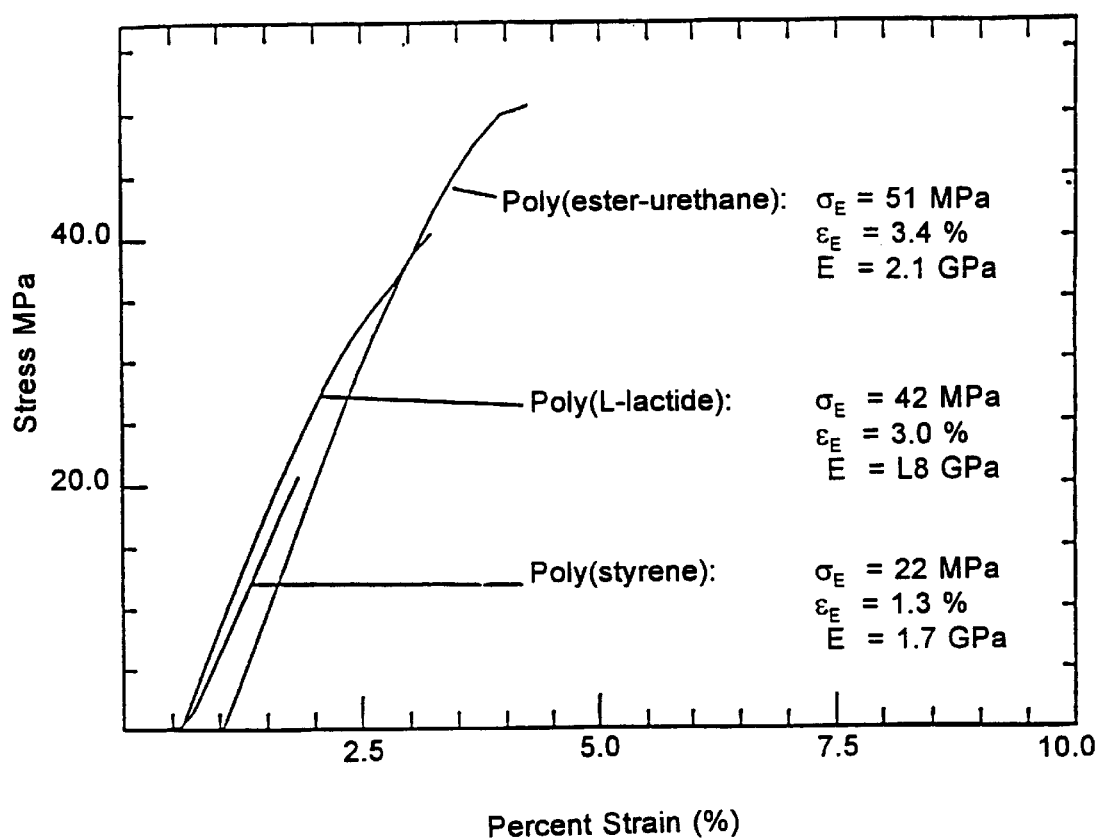

FIG. 5 indicates the molar mass distribution of the polymer prepared in Example 5;

FIG. 6 shows the molar mass distribution of the polymer prepared in Example 8;

FIG. 7 shows the molar mass distribution of the polymer prepared in Example 9;

FIG. 8 shows the molar mass distribution of the polymer prepared in Example 10;

FIG. 9 shows the molar mass distribution of the polymer prepared in Example 11;

FIG. 10 depicts the glass transition temperatures of copolymers of lactic acid and mandelic acid as a function of the molar amount of mandelic acid;

FIG. 11 shows the biodegradability of the poly(ester urethane) at +25° C. as a function of time;

FIG. 12 shows the biodegradability of the poly(ester urethane) at +60° C. as a function of time:

FIG. 13 indicates the results of capillary rheometry of poly(ester urethane)s run at three different temperatures; and FIG. 14 shows the stress-stain curves for poly(ester urethane), poly-L-lactide and polystyrene.

Prepolymer Preparation

Depending on the amount of reactants, the polyester consists of 0.1–99.9%, typically 50–99.9% of hydroxy acid monomers, and of 99–0.1%, typically 50–0.1% of a diol monomer. The hydroxy acid monomers can be aliphatic and/or aromatic. If the polyester comprises a compolymer of aliphatic and aromatic hydroxy acid monomers, it usually contains about 50–99% aliphatic hydroxy acid monomers and 0.5–40% aromatic hydroxy acid monomers and 10–0.5% diol monomers.

The aliphatic hydroxy acid monomers are preferably L-lactic acid monomers, D-lactic acid monomers or mixtures thereof (e.g. racemic D,L-lactic acid). Other examples of aliphatic hydroxy acid monomers are glycolic acid and α-hydroxy-isobutane acid and mutual mixtures of these compounds as well as mixtures with the lactic acids.

In the copoly(ester urethane)s according to the present invention the aromatic group of the aromatic hydroxy acid forms after copolyesterification either a side group of the polyester or a part of the main chain of the polyester. The first alternative is achieved by copolymerization of aliphatic hydroxy acids with, e.g., mandelic acid or phenyl mandelic acid. The phenyl or benzyl groups of the side chains of these monomers reduce the mobility of the polymer chain after copolyesterification. The mandelic acid used can comprise its D- and L-stereo isomers and also racemic D,L-mandelic acid. It is possible to incorporate an aromatic group which stiffens the structure into the main chain of the copolyester by, for instance, copolymerization of aliphatic hydroxy acid monomer(s) with a para-hydroxy acid, e.g. with p-hydroxybenzoic acid, p-acetoxybenzoic acid, p-hydroxyphenylacetic acid, p-3-hydroxyphenyl propanoic acid or p-hydroxynaphthenoic acid.

The isocyanate used as a coupling agent for the polyurethanes reacts best with hydroxy groups. Normally, when a hydroxy acid is polymerized, one terminal group of the chain is formed by a carboxylic acid and the other by a hydroxyl group. The coupling of such a prepolymer with diisocyantes has proved to be difficult and too much cross-linking will occur which is a problem. According to the present invention said problem has been solved by producing a prepolymer with a polymers chain, both ends of which are provided with hydroxyl groups.

According to the present invention the hydroxyl-terminated prepolymer is provided by adding to the lactic acid a suitable amount of diol as a reactant. The diol used comprises, in particular, an aliphatic diol, such as ethylene glycol or 1,4-butanediol. As examples of other suitable diols the following may be mentioned: 4,4-isopropylene-diphenol, 2,2-dimethyl-1,3-propanediol, ethanediol, 1,3-propandiol, N,N'-bis(salicylinene)-ethylene-diamine, hydroquinone, sulphuric acid calcium salt of hydroquinone, 4-hydroxy benzylalcohol, 2-ethyl-1,3-hexanediol, 1,4-dihydroxy anthraquinone, 1,8-dihydroxy anthraquinone, 2,2'-dihydroxy biphenyl, 4,4'-dihydroxy biphenyl, 1,5-dihydroxy naphthacene, 2,7-dihydroxy naphthacene, 1,4-cyclohexane diol, 4-hydroxybenzyl alcohol, 4-hydroxy phenylsulfone, dihydroxyacetone, bisphenol A and B and antrarufine. Preferably the amount of the aliphatic diol is 0.1–10 mol-% of the amount of the hydroxy acid monomer and the molar ratio of the hydroxy and carboxy groups of the monomers which are copolymerized is over 1. For example, 1,4-butanediol is used in amounts of about 1–5 mol-%.

The preparation of the prepolymer, i.e. the copolymerization of the hydroxy acid monomer by condensation-copolymerization can be carried out in any apparatus suitable for esterification reactions. According to a preferred embodiment the polyesterification is carried out as mass polymerization in the melt state, the water formed as a condensation product can be removed by conducting dry inert gas into the polymer melt under stirring. The removal of the water can also be improved using reduced pressure, the pressure of the reaction being reduced gradually so that the boiling point of the polymer melt is not exceeded. The level of the pressure is limited by the boiling of the polymer, which means that in practice a pressure of about 20 mbar is the lowest applicable pressure.

In the below presented examples the polyester is prepared on a laboratory scale "Rotavapor"-type apparatus, which allows for continuous removal of water.

It is preferred to carry out the polyesterification in the presence of a catalyst and, according to one preferred embodiment, a known polyesterification catalyst is used. Catalysts of this kind are, for example, tin or alkyl or alkoxy compounds of tin, such as stannous octoate.

The molar mass of the polyesterification product grows at a rate dependent on the polymerization temperature. When the polymerization temperature increases above 210° C., decomposition of the polymer chains will begin to restrict the polymerization rate. The formation of a detrimental by-product, i.e. the lactone, will substantially increase at temperatures above 220° C. For the above reasons, it is preferred to increase the temperature of the polyesterification gradually in the temperature range of 140–200° C. at a rate of 5–50° C./h and in the temperature range of 200–230° C. at a rate of 0–30° C./h.

According to a preferred alternative, the polyesterification will be initiated at a temperature of about 160° C., and the temperature is then gradually increased to 210° C. Similarly, the pressure is gradually decreased from 220 to 40 mbar, and the condensation product is continuously removed with the aid of nitrogen. This standard procedure will produce a polyester-prepolymer, with a number average molar mass of about 2,000–8,000 g/mol (e.g. about 4,000 g/mol) and a polydispersitivity of about 1.5–2.5. At the final stage of the polyesterification, the low molar mass fraction can, if desired, be removed from the reaction mixture by decreasing the pressure to cause said fraction to distill off.

Esterification is continued until a suitably low acid number is obtained, advantageously an acid number of less than 10, preferably less than 5 and in particular less than 3. The free acid catalyzes the binding of the isocyanate to the urethane bond and thus causes cross-linking and impairs the preparation of the poly(ester urethane).

Figure 1:
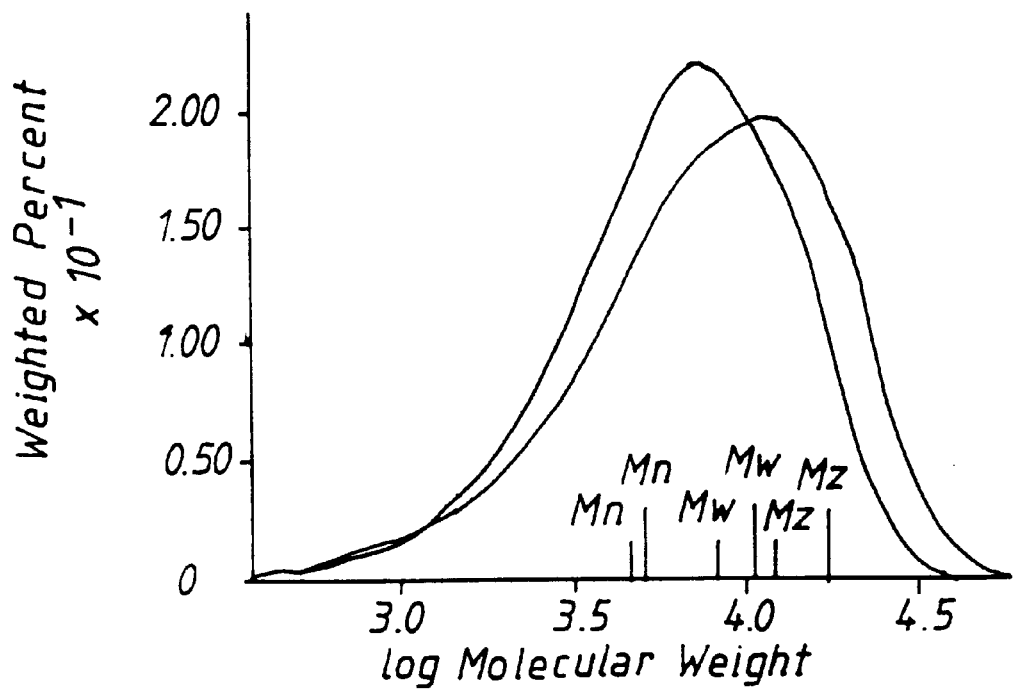

The molar mass of the functionalized polyester will be smaller than that of the unfunctionalized polyester, which is also apparent from FIG. 1.

Characterization of the Prepolymer

The obtained prepolymer is a brittle, colourless, translucent and amorphous material. A prepolymer consisting exclusively of aliphatic hydroxy acid monomers has a clear glass transition temperature ($T_g$) of about 40° C., which can be seen from the DSC graph. No crystallinity can be observed. When the prepolymer according to the present invention is compared with poly-L-lactide it can be noticed that the glass transition point, $T_g$, of the polyester according to the invention is of the same order as that of PLLA with a comparable molar mass, but the polyester has none of the crystallinity typical for PLLA, at least immediately after the polymerization. By copolymerizing 90–80% aliphatic hydroxy acid monomers with 10–20% mandelic acid, the glass transition temperature of the poly(ester urethane) prepared as the final product can be raised with about 5–7° C. in comprison to a poly(ester urethane) consisting only of aliphatic hydroxy acid monomers. The aromatic sidegroups of mandelic acid increase the glass transition temperature by forming a sterical hinder to the mobility of the polymer chain and they thus increase the stiffness of the chain. Even if a reduction of the molar mass lowers the glass transition temperature, the glass transition temperatures of copolymers of lactic acid and mandelic acid clearly increases, when the molar ratio of mandelic acid grows. FIG. 10 shows the glass transition temperatures as a function of the molar ratio of mandelic acid.

The molar masses of copolymers of lactic acid and p-hydroxybenzoic acid will be somewhat lower than those of copolymers of lactic acid and mandelic acid. The products are still translucent and hard. Even if an increase of the molar ratio of p-hydroxybenzoic acid from zero to 20 mol-%: lowers the molar mass of the prepolymer to a quarter of that of pure polylactic acid, the glass transition temperature of the prepolymer does not, however, drop. Due to its small molar mass prepolymers containing p-hydroxybenzoic acid (or corresponding aromatic acids, such as p-acetoxybenzoic acid) can be used for preparing by coupling reactions poly(ester urethane) with very high glass transition temperatures. This is due to the fact that the smaller the prepolymer is the more urethane bonds are formed therein and the urethane bonds increase the glass transition temperature just as the aromatic hydroxy acids. By using prepolymers of low molar mass the molar mass distribution of the poly(ester urethane) can be broadened more rapidly during copolymerization and by continuing polymerization it is possible to obtain a higher molar mass that with, for example, a prepolymer based solely on lactic acid.

As a result of a side reaction to hydroxy acid polymerization, corresponding cyclic ethers, i.e. lactones, are formed. Thus, during condensation polymerization of lactic acid, L-lactide is easily formed. During the standard polymerization process the lactide is sublimed into the collecting vessels of the condensation product in amounts of less than 1% of the reactants, but $^1$H-NMR analysis has shown that some L-lactide will remain in the product. Typically, the lactide concentration is, however, smaller than 10 wt-% (for example about 3 to 5%) and the concentration of free lactic acid is also less than 10 wt-%. The polyester contains 0—about 0.5 wt-% of the polyesterification catalyst.

The molar masses of prepolymers have been determined by GPC using polystyrene standards, if nothing else has been indicated. In some of the examples, the molar masses of the prepolymers have also been measured by using a $^{13}$C-NMR-process in order to determine the concentration of terminal groups.

By suitable changes of the conditions of the polyesterification and functionalization the number average molar mass of the prepolymer can be adjusted to 500 to 20,000; preferably it is about 1,000 to 8,000 g/mol. A low molar mass is preferred for the preparation of poly(ester urethane).

Poly(ester urethane) Preparation

The present poly(ester urethane) is prepared by joining together the polymer chains of the prepolymer with coupling agents, which react with the functional groups at the terminal ends of the chains. According to the present invention it is possible to prepare a biodegradable poly(ester urethane) with a relatively high molar mass from a OH-terminated prepolymer and diisocyanate by using relatively short polymerization times. The coupling reaction, which in the following also is called copolymerization, is preferably carried out as bulk polymerization in the melt state. The diisocyanate used usually comprises an aliphatic diisocyanate, such as 1,6-hexamethylene diisocyanate. When a further increase by about 5 to 7° C. of the glass transition temperature of the poly(ester urethane) is desired, instead of an aliphatic isocyanate (such as hexamethylene diisocyanate) an alicyclic diisocyante, such as 3-isocyanatemethyl-3,5,5-trimethylcyclohexyl isocyanate is used. In contrast to hexamethylene diisocyanate, isophorone diisocyanate does not increase the polydispersity, which apparently is due to the fact that the isocyanate group cannot as easily react with the urethane bonds, which means that the molar mass distribution does not broaden.

The reaction can be carried out in the presence of a catalyst. Preferred catalysts are, by way of example, tin octoate, dibutyltin dilaurate, dibutyltin diacetate and tertiary amines, such as 1,4-diaza(2,2,2)bicyclo-octane. The catalyst amount is 2%, at the most, of the total weight of the reaction mixture.

During copolymerization the molar ratio between the isocyanate groups of the diisocyanate and the hydroxyl groups of the polyester is typically 0.5–1.5, e.g. 0.7– 1.2, preferably about 1. The molar ratio between the isocyanate groups and the hydroxyl groups of the polyester can also be over 1, preferably about 1.2–1.5, if an at least partially cross linked product is aimed at. A cross linked product can also be obtained by continuing the polymerization long enough (cf. below).

The copolymerization is carried out at a temperature of about 130–240° C., preferably 150–220° C., and copolymerization is continued until the obtained copoly(ester urethane) is at least essentially free from free isocyanate groups. Preferably copolymerization is continued until the molar mass distribution of copoly(ester urethane), expressed by the ratio $M_w/M_n$, is at least 2. By increasing the polymerization temperature it is possible to improve the reaction between the terminal groups of the prepolymer and the diisocyanate and, at the same time, to increase the glass transition temperature. This is particularly clearly seen with isophorone diisocyanate.

On a laboratory scale the copolymerizations have been carried out under an atmosphere of argon in a 300 ml glass reactor as melt polymerizations. The mixer used comprises a rod mixer suitable for viscous masses and the coupling temperature has been 180° C. The progress of the coupling reaction has been monitored by taking samples from the polymerization mixture with 15 minutes intervals.

Figure 2:
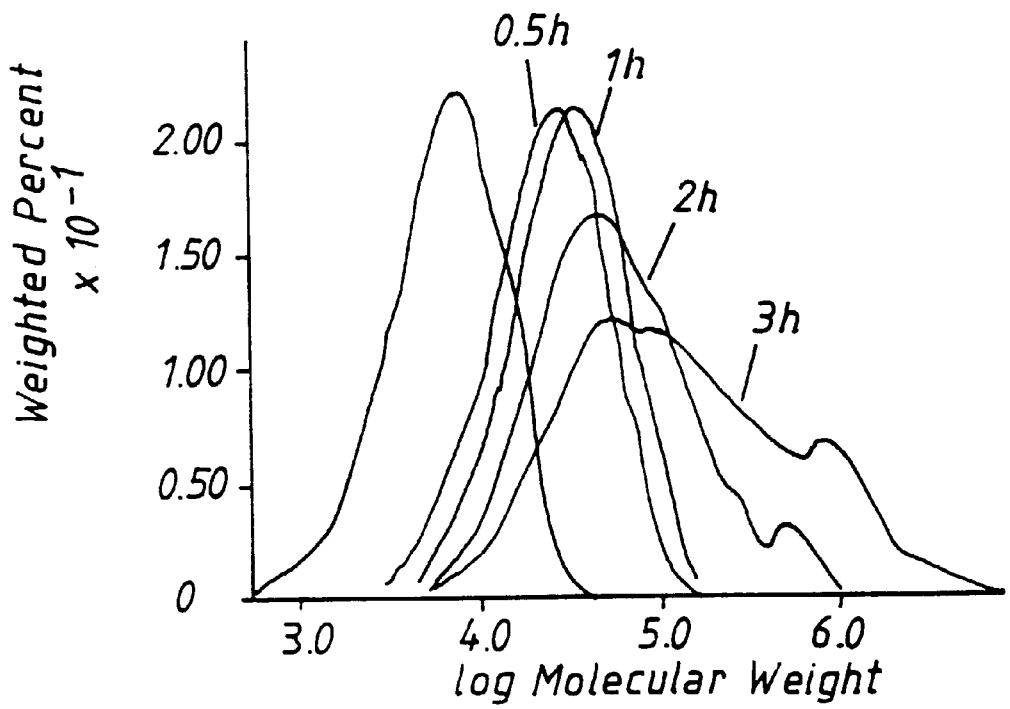
FIG. 2 shows the development of the average molar mass as a function of the polymerization time in connection with a process according to the invention.

FIG. 2 shows the development of the molar mass as the coupling reaction progresses when the molar ratio between the isocyanate and the hydroxy groups is about 1:1. In the case shown in the Figure the prepolymer used comprises a poly(L-lactic acid+2% 1,4-butanediol) polyester and as a diisocyanate hexamethylene diisocyanate. It will appear from the Figure that in the initial stages of the coupling polymerization the number average molar mass will grow rapidly and the molar mass distribution will remain narrow. During the first 30 minutes the terminal ends of the chains will be subjected to the coupling reaction. Longer polymerization times will give rise to a clear broadening of the molar mass distribution, which can be seen from a strong increase of the weight average molar mass. It can be inferred from FIG. 2 that after about 30 minutes (at the prevailing reaction temperature of 180° C.) long chain branching will take place which will lead to a broadening of the molar mass distribution so that the portion of high molecular weight polymers increases. After about 1.5 hours cross-linking of the product will begin, which increases the molar mass distribution even more. If considerable cross-linking is aimed at, the molar mass will easily grow very large (in theory infinitely) and then it cannot even be measured.

Figure 3:
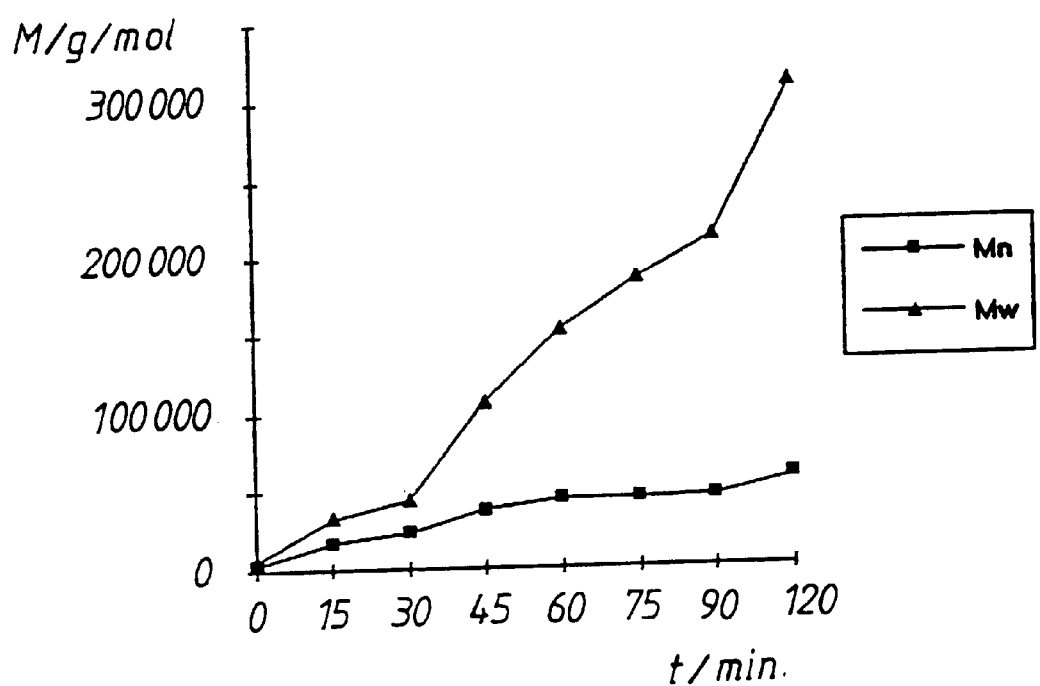
FIG. 3 depicts the molar mass distributions of a prepolymer and a poly(ester urethane) after 0.5, 1, 2 and 3 hours of polymerization.

From the molar mass distributions shown in FIG. 3 it will furthermore appear that with prolonged polymerization times there will clearly be formed a multimodal (in the case shown in the Figure: bimodal) molar mass distribution. This can be explained by beginning long-chain branching and cross-linking, when the free isocyanate reacts with the urethane bond.

Figure 4:
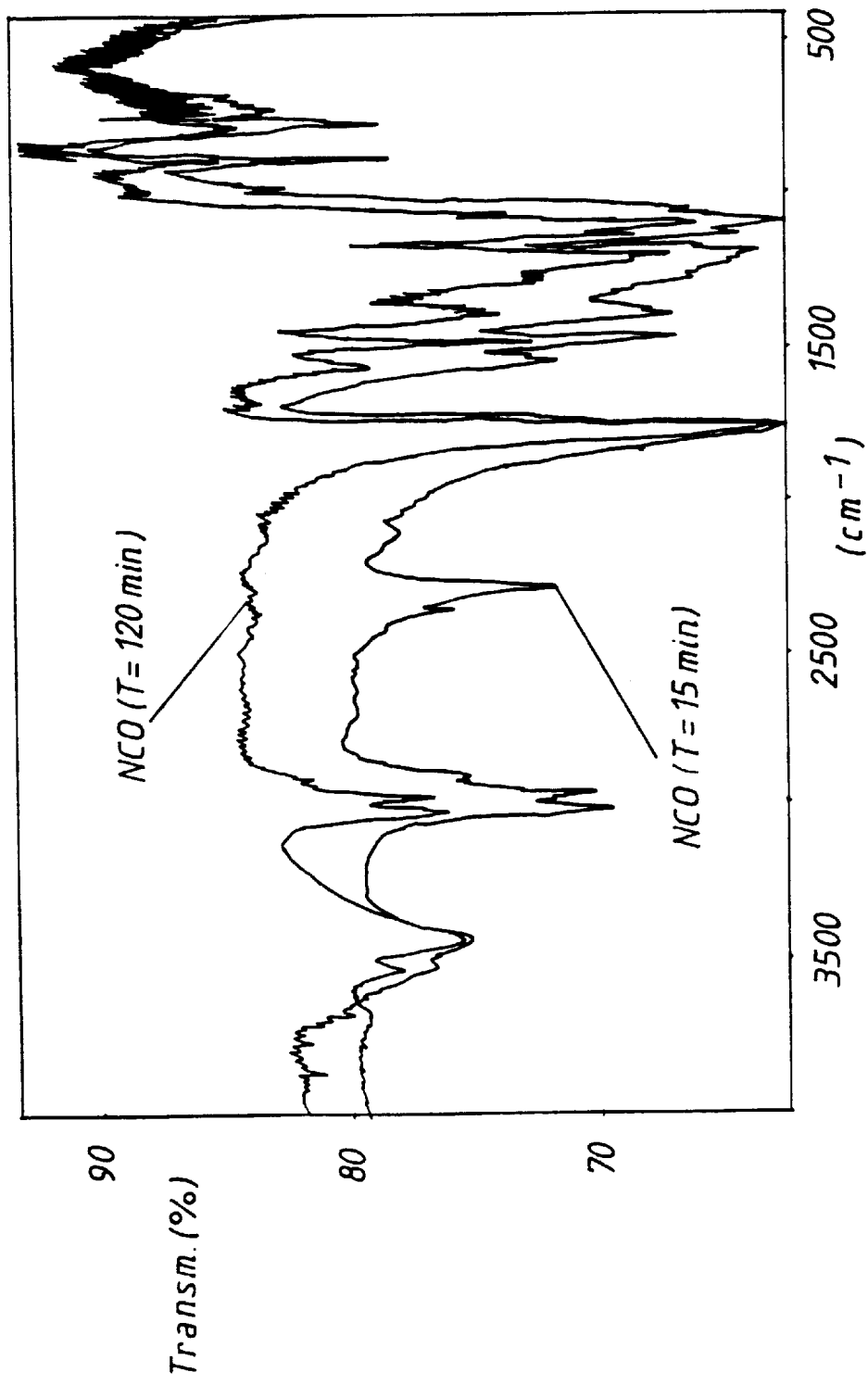
FIG. 4 shows the IR spectrum of a poly(ester urethane) according to the invention at the beginning of the polymerization and at the end.

The samples have been subjected to IR-spectrometry and their molar mass distributions have been determined by GPC. IR-spectrometry (FIG. 4) is very well suited to monitoring the progress of the reaction, because the NCO-groups have a characteristic peak at 2270 $cm^{-1}$. After the reaction there is at said wave number no peaks of other compounds.

Polymer Properties

The number average molar mass, $M_n$, of the prepared polymer is typically 15,000–100,000 g/mol, its weight average molar mass, $M_w$, is 30,000–600,000 g/mol and molar mass distribution, expressed by the ratio $M_w/M_n$, is 2–20, preferably about 3–12. The polymer is essentially free from free isocyanate groups (in other words the diisocyanate compounds have reacted completely or at least to 99%) and the concentration of free hydroxy acid monomers and lactides is 3% at the most calculated on basis of the weight of the polymer.

All polymer prepared according to the present invention, including the cross-linked copolymers of lactic acid and mandelic acid, are melt-processable, the viscosity of the polymer melt being between 10 and 5,000 Pa s, preferably 50 and 2,000 Pa s, determined by capillary rheometry at a temperature of 200° C. at a shear rate of 200 1/s. In some of the cases, the prepared poly(ester urethane)s are long chain branched.

When 1,6-hexamethylene diisocyanate is used as coupling agent poly(ester urethane)s are obtained, which have a tensile modulus of about 1.8 to 2.2 GPa, maximum tension of about 43–50 MPa and a maximum elongation of about 1.5 to 5%. No significant difference between the tensile strenght values for polyester prepared from poly(L-lactic acid) and copolymers of L-lactic acid and mandelic acid (LLA/MA), respectively, can be noticed, although the number average molar masses of copolymers of mandelic acid are lower. The weight average molar masses are, however, close to each other and the attachment of an aromatic ring stiffens the (LLA/MA)-copolymers, which partly compensates for the lower molar mass so that no clear differences can be notice during determination of the tensile strenghts.

From DSC analysis of the prepolymer and the polymer obtained as the end product it can be noticed that both polymers are amorphous. In comparison to a poly(ester urethane) consisting solely of aliphatic hydroxy acid monomers, copolymerization with stiffening components will lead to a product having a $T_g$ which is more than 10° C., even 12° C., higher, i.e. about 60–65° C.

Despite its good processibility the poly(ester urethane) according to the invention is hydrolytically degradable in a biological surrounding. As the below examples (cf. Example 25) will show, the poly(ester urethane) according to the invention is hydrolytically decomposable, and its weight average molar mass is reduced to half at a hydrolysis temperature of 60° C. at pH 7 within a maximum of 100 days.

The mechanical properties of the products of the coupling polymerization have also been determined. Table 1 shows that the tensile strenght and stiffness of the polymer are very good. The polymer samples, including the reference samples, were prepared from formpressed sheets by sawing and they do not therefore meet any standard, but they are comparable.

TABLE 1

Preliminary tensile strength values and elasticity moduli for poly (ester urethane)s and comparison samples

| Polymer | Tensile strenght MPa | Elasticity modulus GPa | Elongation at break % |
| --- | --- | --- | --- |
| PEU | 47 | 1.7 | 4.4 |
| PLLA | 36 | 1.6 | 2.9 |
| Polystyrene | 22 | 1.7 | 1.3 |
| HDPE | 20 | 0.6 | 9.1 (yield) |

It appears from the results that the final coupled poly(ester urethane) (PEU) is of a rather hard and stiff type but also comparitively brittle. The polymer is, however, clearly tougher that glass clear polystyrene. Its properties are very close to poly(L-lactide) prepared by the ring opening method, and even somewhat better, at least compared with these comparison samples.

The processibility of the poly(ester urethane) is examined also in Example 26.

Blending, Filling and Reinforcing of the Poly(ester urethane)

The new poly(ester urethane) can be melt-blended with other melt-processible polymers (e.g. thermoplastics), whereby depending on the blending proportions either the properties of the novel poly(ester urethane) or those of the other polymer are modified. As examples of polymers, which can be melt-blended with the poly(ester urethane), polyesters and polyolefins can be mentioned, which will affect, for example, the biodegradability of the polymer blend. The heat resistance of the poly(ester urethane) can be improved, for example, melt-blending it with poly(ethylene terephthalate) (PET).

The new poly(ester urethane) can also be filled or reinforced with fillers or reinforcing agents, which makes it possible, for example, to increase the heat resistance of the poly(ester urethane), to improve the mechanical properties or to decrease the costs thereof. Suitable fillers are, for example, chalk or talc. Suitable reinforcing agents are, e.g., cellulosic fibres or hamp.

Applications of the Poly(ester urethane)

Thanks to the long chain branching of the polymer the novel poly(ester urethane) is particularly suitable for coating of paper or cardboard, which for technical reasons nowadays is being made of LD-polyethylene containing long chained branches.

The novel poly(ester urethane)s have a broad application range. Thus, they can be used for the preparation of injection moulded pieces and thermoformed and blow moulded packages and bottles. The polymer can be used as a coating for bags, sacks and films made of paper or cardboard. They can be shaped into blow moulded or plane films from which bags and sacks can be made. The polymers can also be used for the preparation of fibres and fabrics (non-woven -products). Expanded plastic products, cellular plastic and foams, suitable for, e.g., package fillings can be prepared from them. Finally, they are suitable as coatings of matrices for controlled-released fertilizers and drugs.

For all of the above mentioned applications, the unique properties of the novel poly(ester urethanes), involving the combination of biodegradability and good mechanical properties of the novel poly(ester urethane)s, can be utilized.

The following examples will describe the invention in more detail:

EXAMPLE 1

Preparation of hydroxyl-terminated poly(lactid acid) prepolymer

As a reactor, a 2 liter "Rotavapor"-type rotatory evaporator was employed. 720 g L-lactic acid, 14.4 g 1,4-butane diol and 0.4 g stannous octoate were introduced into the reactor. Dry nitrogen was fed below the liquid surface of the reaction mixture and the reactor was evacuated to an absolute pressure of 220 mbar. The reaction vessel was partly immersed into an oil bath having a temperature of 160° C., and the reaction mixture was mixed by starting the rotation at a speed of 100 rpm. The temperature of the oil bath was increased steadily at a rate of 20° C./h up to a temperature of 200° C., and furtheron at a rate of 5° C./h to a temparature of 210° C. Then polymerization was continued for a further 4.5 hours in the oil bath at a temperature of 210° C. The pressure was lowered after one hour's polymerization to a pressure of 160 mbar and then with one hour-intervals to 120 mbar and 80 mbar. Once the pressure had been kept at 80 mbar for two hours, the pressure was three times more decreased by 15 mbar with one hour-intervals, until the pressure was 20 mbar at the end of the polymerization after 8.5 hours from the start. During the whole polymerization dry nitrogen was bubbled below the surface of the reaction mixture. The condensed water formed during polymerization was recovered as it was formed.

The molar mass of the polymer obtained was analyzed on a GPC apparatus (Gel Permeation Chromatography) and the number average molar mass was determined as being 4,300 g/mol in comparison to polystyrene standards, and the polydispersity 1,7. $^{13}$C-NMR analysis showed that the terminal groups of the polymer chains were almost completely hydroxyl groups and the polymer contained 5.7 wt-% L-lactide and 5,6 wt-% L-lactic acid. DSC-analysis (Differential Scanning Calorimetry) indicated that the glass transition temperature of the polymer was 39° C. and no crystalline melting peaks were noticed, which means that the polymer is entirely amorphous.

EXAMPLE 2

Preparation of hydroxyl-terminated poly(lactid acid) prepolymer

The polymerization was carried out as described in example 1 with the exception that the amount of 1,4-butane diol was 7.2 g, and the polymerization time was extended with two further hours at the conditions prevailing during the last stage.

The molar mass of the polymer obtained was analyzed with GPC and the weight average molar mass was found to be 6,900 g/mol in comparison to polystyrene samples and the polydispersity 1.6. $^{13}$C-NMR analysis showed that the terminal groups of the polymer chains were almost exclusively hydroxyl groups and the polymer contained 4.9 wt-% L-lactide and 3,6 wt-% L-lactic acid. DSC-analysis (Differential Scanning Calorimetry) indicated that the glass transition temperature of the polymer was 40° C. and no crystalline melting peak was noticed.

EXAMPLE 3

Preparation of hydroxyl-terminated poly(lactid acid) prepolymer

The polymerization was carried out as described in example 1 with the exception that the amount of 1,4-butane diol was 28.4 g.

The molar mass of the polymer obtained was analyzed on a GPC-apparatus and the weight average molar mass was determined as being 2,500 g/mol in comparison to polystyrene samples and the polydispersity 1.6. $^{13}$C-NMR analysis showed that the terminal groups of the polymer chains were almost exclusively hydroxyl groups and the polymer contained 2.6 wt-% L-lactide and 7.3 wt-% L-lactic acid. DSC-analysis (Differential Scanning Calorimetry) indicated that the glass transition temperature of the polymer was 39° C. and no crystalline melting peak was noticed.

EXAMPLE 4

Preparation of a hydroxyl-terminated poly(lactic acid) prepolymer from D,L-lactic acid monomers The polymerization was otherwise carried out as in Example 1, but instead of L-lactid acid a racemic 50:50 mixture of L- and D-lactic acid, i.e. D,L-lactic acid, was used.

The molar mass of the obtained polymer was analysed on a GPC apparatus and the number average molar mass was found to be 4,100 g/mol compared with polystyrene standards and the polydispersity 1.7. $^{13}$C-NMR analysis showed that the terminal groups at the end of the polymer chains were almost exclusively hydroxyl groups and the polymer contained 5.0 wt-% D,L-lactide and 5.6 wt-% D.L-lactic acid. A DSC analysis showed that the polymer had a glass transition temperature of 38° C., and no crystalline melting peak could be detected.

EXAMPLE 5

Preparation of hydroxyl-terminated precopolymer from L-lactic acid and D,L-mandelic acid The reactor used was a 2 liter rotary evaporator. 450 g L-lactic acid, 76 g DL-mandelic acid (corresponding to 10 mol-% mandelic acid), 9.9 g 1,4-butane diol and 0.29 g stannous octoate were metered into the reactor, and then nitrogen feed was started and the reactor was evacuated to an absolute pressure of 240 mbar. The reactor was partially immersed into an oil bath. The temperature of the oil bath was raised at a rate of 20° C./h to a temperature of 200° C. and furtheron at a rate of 5° C./h to a temperature of 210° C. The latter temperature was maintained until the end of polymerization. The pressure was reduced with one hour's intervals by the following steps: 240 (start)—160—130—95—80—65—50—40 mbar, and the last-mentioned pressure was maintained until the end of the polymerization. Nitrogen bubbling was maintained during the whole polymerization and the water formed during the reaction was recovered as it was formed. The total polymerization time was 8 hours.

The number average molar mass of the obtained polymer was, as determined by GPC, 3,700 g/mol compared to polystyrene standards and the polydispersity was 2.1. DSC analysis showed that the glass transition temperature of the polymer was 44° C., and no melting peak could be found, which indicates that the polymer is completely amorphous.

EXAMPLE 6

Preparation of hydroxyl-terminated precopolymer from L-lactid acid and D,L-mandelic acid The polymerization was carried out as in Example 1, but the amounts of the reactants were: 450 g L-lactic acid, 190 g D,L-mandelic acid (corresponds to 20 mol-% mandelic acid), 12 g 1,4-butane diol and 0.33 g stannous octoate, and the polymerization time was 10 hours.

The number average molar mass of the obtained polymer was, as determined by GPC, 4,200 g/mol in comparison to polystyrene standards and the polydispersity was 2.2. DSC analysis showed that the glass transition temperature of the polymer was 52° C., and no melting peak could be found.

EXAMPLE 7

Preparation of hydroxyl-terminated prepolymer from L-lactic acid and hydroxy benzoic acid or acetoxybenzoic acid L-lactic acid (LLA) and hydroxy benzoic acid or acetoxy benzoic acid were copolymerized with butanediol. Table 2 presents the number average molar masses and glass transition temperatures of the copolymers.

TABLE 2

Number average molar masses and glass transition temperatures of poly(L-lactic acid-co-p-hydroxybenzoic acid) and poly(L-lactic acid - co-4-acetoxybenzoic acid)

| Molar ratio of LLA | LLA/hydroxybenzoic acid | | LLA/acetoxybenzoic acid | |
|---|---|---|---|---|
| | Molar mass $M_n$ (g/mol) | Glass trans. temp. (° C.) | Molar mass $M_n$ (g/mol) | Glass trans. temp. (° C.) |
| 1.00 | 4700 | 35 | — | — |
| 0.95 | 2700 | 35 | 2000 | 42 |
| 0.90 | 2000 | 33 | 1400 | 37 |
| 0.85 | 1600 | 32 | 1100 | 40 |
| 0.80 | 1200 | 34 | 750 | 36 |

Usually, for low molar mass polymers the glass transition temperature is very dependent on the molar mass. When the molar mass grows smaller the number of terminal groups increases, which increases the free volyme and the mobility of the chains, whereby the glass transition temperature drops. It clearly appears from Table 2 that copolymerization of LLA with p-hydroxy- and p-acetoxybenzoic acid prevents a lowering of the glass transition temperature even if the molar mass is reduced.

EXAMPLE 8

Preparation of hydroxyl-terminated prepolymer from different diols

Under the same conditions as used in Example 1, hydroxyl-terminated polyesters were prepared from L-lactic acid with four other diols. By using ethanediol a polyester was obtained, which had a weight average molar mass of 4,300 g/mol and a weight average molar mass of 7,200 g/mol. From 1,3-propanediol a polyester was obtained, whose corresponding molar mass values were 5,000 g/mol and 7,900 g/mol, respectively. 2-ethyl-1,3-hexanediol, again, produced a polyester, which had a number average molar mass of 16,500 and a weight average molar mass of 25,000, and 2,2-dimethyl-1,3-propanediol yielded a polyester, whose molar mass values were 4,000 g/mol and 7,000 g/mol, respectively.

EXAMPLE 9

Poly(ester urethane) preparation 40 g of a prepolymer prepared from L-lactic acid according to Example 1 were metered into a 300 ml glass reactor.

The weight average molar mass of the prepolymer was, as determined by NMR, 2,000 g/mol (based on the ratio between the terminal group carbons and the chain carbons). An argon stream was conducted into the reactor and the temperature was adjusted to 150° C. Once the polymer had melted mixing was started and 3.4 g of hexamethylene diisocyanate ($n_{NCO}$:$n_{OH}$=1:1) was added into the polymer melt. After this addition the temperature was raised to 180° C. and polymerization was continued for 30 min after the point of time when the polymer did not contain any isocyanate groups (detemined by IR spectrometry). The urethane polymer obtained as an end product had a number average molar mass, determined by GPC, of 57,000 g/mol and a weight average molar mass of 390,400 g/mol. The polydispersity was 6.9. FIG. 5 indicates the molar mass distribution of the final product. The glass transition temperature $T_g$ measured by DSC was 53.7° C.

EXAMPLE 10

Preparation of poly(ester urethane) at a higher $n_{NCO}$:$n_{OH}$-ratio

The polymerization was carried out as in Example 9, but the amount of the 1,6-hexamethylene diisocyanate used was 4.25 g ($n_{NCO}$:$n_{OH}$=5:4). The polymer obtained as an end product was insoluble in solvents. The glass transition temperature of the amorphous polymer, determined by DSC, was 50.2° C.

EXAMPLE 11

Preparation of poly(ester urethane) at a higher $n_{NCO}$:$n_{OH}$-ratio

The polymerization was carried out as in Example 9, but the amount of the 1,6-hexamethylene diisocyanate used was 5.1 g ($n_{NCO}$:$n_{OH}$=3:2). The polymer obtained as an end product was insoluble in solvents. The glass transition temperature of the amorphous polymer, determined by DSC, was 52.1° C.

EXAMPLE 12

Preparation of poly(ester urethane) at a lower $n_{NCO}$:$n_{OH}$-ratio

The polymerization was carried out as in Example 9 except that the amount of 1,6 hexamethylene diisocyanate was 2.5 g ($n_{NCO}$:$n_{OH}$=3:4). The molar masses of the polymer obtained as end product were: $M_n$=33,200 g/mol and $M_w$=71,700 g/mol. The polydispersity was 2.2. FIG. 6 shows the molar mass distribution of the end product polymer. The glass transition temperature of the amorphous polymer, determined by DSC, was 53.2° C.

EXAMPLE 13

Preparation of poly(ester urethane) at low temperature

The polymerization was carried out according to Example 9, with the exception that the the temperature used during polymerization was also 150° C. The molar masses of the polymer obtained as end product were: $M_n$=29,000 g/mol and $M_w$=78,400 g/mol. The polydispersity was. 2.7. FIG. 7 shows the molar mass distribution of the end product polymer.

EXAMPLE 14

Shortening of the polymerization time of the poly (ester urethane)

The polymerization was carried out according to Example 9, with the exception that the polymerization was stopped immediately when it was found by IR Spectrophotometry that there was no more free isocyanate present. The molar masses of the polymer obtained as end product were: $M_n$=45,000 g/mol and $M_w$=211,000 g/mol. The polydispersity was 4.7. FIG. 8 shows the molar mass distribution of the end product polymer. The glass transition temperature of the amorphous polymer, determined by DSC, was 53.5° C.

EXAMPLE 15

Preparation of poly(ester urethane) from alicyclic diisocyanate

The polymerization was carried out according to Example 9 with the exception that the diisocyanate used comprised Vestanat IPDI (isophorone diisocyanate). The molar masses of the polymer obtained as end product were: $M_n$=20,200 g/mol and $M_w$=38,300 g/mol. The polydispersity was 1.9. FIG. 9 shows the molar mass distribution of the end product polymer. The glass transition temperature of the amorphous polymer, determined by DSC, was 59.4° C.

EXAMPLE 16

Preparation of poly(ester urethane) from a prepolymer produced from racemic lactic acid monomers The polymerization was carried out as in Example 9 with the exception that the prepolymer used comprised a prepolymer prepared according to Example 4 from D,L-lactic acid. The $M_n$, $M_w$, polydispersity and the glass transition temperature (by DSC) of the amorphous polymer forming the end product were determined.

EXAMPLE 17

Preparation of poly(ester urethane) from a prepolymer of low molar mass

The polymerization was carried out as in Example 9 with the exception that the prepolymer used was a prepolymer prepared according to Example 3 from L-lactic acid, the number average molar mass of which was 1,070 g/mol, as measured by NMR. The $M_n$, $M_w$, polydispersity and the glass transition temperature (by DSC) of the amorphous polymer forming the end product were determined.

EXAMPLE 18

Preparation of poly(ester urethane) from a prepolymer of high molar mass

The polymerization was carried out as in Example 9 with the exception that the prepolymer used was a prepolymer prepared according to Example 2 from L-lactic acid, the number average molar mass of which was 3,670 g/mol, as measured by NMR. The $M_n$, $M_w$, polydispersity and the glass transition temperature (by DSC) of the amorphous polymer forming the end product were determined.

EXAMPLE 19

Preparation of poly(ester urethane) from a polyester containing 10 mol-% mandelic acid The reactor used comprised a 300 ml glass reactor equipped with a blade mixer. 40 g of the prepolymer prepared in Example 5 were weighted into the reactor. After an argon purge (15 min) the reactor was put into an oil bath, the temperature of which was adjusted to 150° C. After the melting of the prepolymer (30 min), the mixer was started and after 15 min 4.2 g of 1,6-hexamethylene diisocyanate ($n_{NCO}$:$n_{OH}$≈1:1) weres added. After this addition the temperature of the oil bath was raised to 180° C. The polymerization was continued as long as the mixer's momentum increased, however at least so long that the polymer did not contain any isocyanate groups (checked with FTIR spectrophotometry), in case of this specific polymerization: 110 min.

The number average molar mass of the poly(ester urethane) obtained as the end product was 16,000 g/mol, the weight average molar mass was 116,000 g/mol and the polydispersity 8.0. The glass transition temperature of the amorphous polymer was 58° C., determined by DSC analysis, and for a DMTA analysis (dynamic-mechanical thermoanalysis) the maximum of the tanδ-graph peak was 61° C. and the maximum for the loss modulus peak was 55° C.

EXAMPLE 20

Preparation of poly(ester urethane) from a prepolymer containing 20 mol-% mandelic acid The coupling polymerization was carried out in a similar way as in Example 19, but the prepolymer used was the prepolymer of Example 6, which contained 20 mol-% of D,L-mandelic acid. The polymerization temperature was 150 min.

The number average molar mass of the poly(ester urethane) obtained as the end product was 23,000 g/mol, the weight average molar mass was 120,000 g/mol and the polydispersity 6.7. The glass transition temperature of the amorphous polymer was, determined by DSC analysis, 60° C. and for a DMTA analysis (dynamic-mechanical thermoanalysis) the maximum of the tanδ-graph peak was 64° C. and the maximum of the loss modulus peak was 57° C.

The results of Examples 19 and 20 are summarized in Table 3. A poly(ester urethane) prepared from poly(L-lactic acid) is used as reference.

EXAMPLE 21

Preparation of poly(ester urethane) from isophorone diisocyanate

The coupling polymerization was carried out as in Example 19, but the isocyanate used comprised 5.6 g of 3-isocyanate-methyl-3,5,5-trimethylcyclohexyl isocyanate (isophorone diisocyanate). The polymerization time was 220 min.

The number average molar mass of the poly(ester urethane) obtained as the end product was 13,500 g/mol, the weight average molar mass 25,300 g/mol and the polydispersity 1.9. The glass transition temperature of the amourphous polymer was 63° C. based on a DSC-analysis.

EXAMPLE 22

Preparation of poly(ester urethane) from isophorone diisocyanate

The coupling polymerization was carried out as in Example 19, but the isocyanate used comprised 5.6 g of 3-isocyanate-methyl-3,5,5-trimethylcyclohexyl isocyanate (isophorone diisocyanate). The polymerization time was 210 min.

The number average molar mass of the poly(ester urethane) obtained as the end product was 10,200 g/mol, the weight average molar mass 18,300 g/mol and the polydispersity 1.8. The glass transition temperature of the amourphous polymer was, based on a DSC-analysis, 65° C.

EXAMPLE 23

Preparation of poly(ester urethane)

The coupling polymerization was carried out in similar way as in Example 19 using isophoronide isocyanate as a coupling agent, but the temperature was raised after the isocyanate addition to 200° C. The polymerization time was 220 min.

The poly(ester urethane) obtained as a final product had a number average molar mass of 19,600 g/mol, a weight average molar mass of 36,000 g/mol and a polydispersity of 1.8. The glass transition temperature of the amorphous polymer was, based on a DSC analysis, 65° C.

Table 4 gives a summary of most important results of Examples 21–23, which have been compared with the corresponding results of a poly(ester urethane) based on poly(L-lactic acid).

TABLE 3

Coupling of prepolymer by polymerization with hexamethylene diisocyanate

| | Prepolymer | | | | Diiso-cyanate | Polymerization conditions | | Average molar masses and molar mass distributions | | | Glass trans. temp. |
|---|---|---|---|---|---|---|---|---|---|---|---|
| | Comonomer | mol-% | Functionalization of chain ends | mol-% Glass trans. temp. $T_g$/° C. | (ml) | Time/min | Temp./° C. | $M_n$/g/mol | $M_w$/g/mol | D | $T_g$/° C. |
| Ref. | — | | 1,4-butane-diol | 2        38 | 3.05 | 90 | 180 | 41,000 | 187,000 | 4.6 | 53 |
| 19 | DL-mandelic acid | 10 | 1,4-butane-diol | 2        44 | 4.00 | 110 | 180 | 16,000 | 116,000 | 8.0 | 58 |
| 20 | DL-mandelic acid | 20 | 1,4-butane-diol | 2        52 | 4.00 | 150 | 180 | 23,000 | 120,000 | 6.7 | 60 |

TABLE 4

Coupling of prepolymer by polymerization with 3-isocyanatemethyl-3,5,5-trimethylcyclohexyl isocyanate

| | Prepolymer | | | | | | | | | | |
|---|---|---|---|---|---|---|---|---|---|---|---|
| | | | Functionalization of | | Glass trans. temp. | Diiso-cyanate | Polymerization conditions | | Average molar masses and molar mass distributions | | Glass trans. temp. |
| | Comonomer | mol-% | chain ends | mol-% | $T_g/°C$ | (ml) | Time/min | Temp./°C | $M_n$/g/mol | $M_w$/g/mol | D | $T_g°C$ |
| Ref. | — | | 1,4-butane-diol | 2 | 38 | 4.05 | 150 | 180 | 28,600 | 73,600 | 2.6 | 61 |
| 21 | DL-mandelic acid | 10 | 1,4-butane-diol | 2 | 44 | 5.30 | 220 | 180 | 13,500 | 25,300 | 1.9 | 63 |
| 22 | DL-mandelic acid | 10 | 1,4-butane-diol | 2 | 44 | 5.30 | 220 | 200 | 19,600 | 36,000 | 1.8 | 65 |
| 23 | DL-mandelic acid | 20 | 1,4-butane-diol | 2 | 52 | 5.30 | 210 | 180 | 10,200 | 18,300 | 1.8 | 60 |

EXAMPLE 24

Hydrolytical degradation of poly(ester urethane)

The poly(ester urethane) of Example 9 was hydrolyzed in a test tube at a temperature of 37° C. at pH 7 in buffered water. After one week of the beginning of the hydrolysis test the number average molar mass of the sample had dropped to 43.000 g/mol and after eight weeks to 5.000 g/mol. Based on these results, it would appear that the original number average molar mass of the sample is reduced by half within about 30 days.

EXAMPLE 25

Biodegradability of poly(ester urethane)

The biodegradability of the poly(ester urethane) was determined at two different temperatures. The samples comprised a) a L-lactic acid based poly(ester urethane), which had been prepared from a poly(lactic acid) prepolymer, the raw material of which comprised to 100% L-lactic acid (sample LL-1), b) a poly(ester urethane), which had been prepared from a prepolymer, the raw material of which comprised to 100% D,L-lactic acid (sample DL-2) and c) a L- and D,L-lacic acid based poly(ester urethane), which had been prepared from a poly(lactic acid) prepolymer, the raw material of which comprised 70% L-lactic acid and 30% D,L-lactic acid (sample DL-3). The references comprised samples of polylactide (PLLA), lactic acid and starch (BIOPAC).

The samples were first milled to particles with particles sizes in the range of 0.12–0.5 mm. Then 10 mg of the sample were dosed into head-space-bottles (117.5 ml). ASTM-nutrient solution was added, 50 ml per bottle. For degradation, a microbial inoculum was used, which was derived from a compost of domestic waste in the thermophilic phase (+60° C.). The microbial concentration of the final solution was $10^5$/ml. The bottles were closed with rubber and aluminium stoppers and then they were set at two different temperatures, viz. +25° C. and +60° C. Incubation was effected under shaking in dark. There were 6 parallel assays.

The assessments were carried out as follows: The concentration of the carbon dioxide in the gas space of the bottles was measured by an infrared analysator (Servomex PA 404, Servomex Company, Massachusetts, USA). The bottles incubated at +60° C. were first allowed to cool to room temperature before the carbon dioxide was measured in order to reduce the error due to gas density and moisture. After the carbon dioxide measurements the gas space of the bottles was changed by blowing for 1 min air with a bent glass rod. After aeration the bottles were closed and set at said temperatures. The pH was determined each week.

The biodegradability of the samples at +25° C. is presented in FIG. 11 and at +60° C. in FIG. 12.

As the figures show, the biodegradability of the poly(ester urethane) according to the invention is quite small at +25° C. This indicates that they are stable at their normal use temperatures. Instead, at the conditions prevailing in a compost, i.e. at +60° C., the samples decompose rather rapidly. And the greater the proportion of the D-lactic acid, the more accelerated the decomposition becomes. Thus, after 28 days, 60% of a poly(ester urethane) consisting of L-lactic acid had decomposed, whereas the biodegradability of a D,L-lactic acid based polymer was up to 82%.

EXAMPLE 26

Melt-processibility of the poly(ester urethane)

The viscosity of the melt of the poly(ester urethane) according to Example 9 was measured by capillary rheometry. The diameter of the rheometre dies was 1 mm and the length 30 mm. At a shear rate of 200 1/s and at a temperature of 180° C., the viscosity of the melt was 1000 Pa s, and at a temperature of 210° C. it was 70 Pa s. FIG. 13 depicts the results of capillary rheometry analysis at three different temperatures (150, 180 and 210° C.). It appears from the Figure that the polymer is processable both in an extruder and in an injection mould.

The stress-to-elongation relations of compression moulded PEU samples as well as the tensile properties thereof are shown in FIG. 14. These properties are compared with the results obtained for poly(L-lactide) and polystyrene at corresponding conditions. It can be noticed from the Figure that the poly(ester urethanes) according to the invention are far better than polylactide and polystyrene as regards their elasticity modulus and maximal tensile strenght.

What is claimed is:

1. Melt-processible poly(ester urethane) polymer, which contains structural units derived from a polyester and structural units derived from a diisocyanate, wherein the polyester has a number average molar mass of 1,000 to 8,000 g/mol, the bonds between the structural units consist essentially of urethane bonds, 50–99.9% of the polyester is formed by hydroxy acid monomer units and 50 to 0.1% of diol monomer units, the number average molar mass, $M_n$, of the polymer is at least 10,000 g/mol, its weight average molar mass, $M_w$, is over 20,000 g/mol and its molar mass ratio, expressed as the ratio $M_w/M_n$ is over 2, the poly(ester urethane) is long-chain branched, the polymer is essentially free from free isocyanate groups, and the poly(ester urethane) is obtained by copolymerizing the polyester with the diisocyanate at a temperature in the range of about 130° C. to 240° C. for a time period greater than about 30 minutes.

2. The poly(ester urethane) according to claim 1, wherein its number average molar mass is 10,000–200,000 g/mol, its weight average molar mass is 20,000–1,000,000, and its molar mass ratio is greater than 2 but less than or equal to 20.

3. The poly(ester urethane) of claim 1 or 2, wherein its molar mass ratio is 3-12.

4. The poly(ester urethane) of claim 1, wherein the polyester is an aliphatic polyester, and wherein 90–99.9% of said aliphatic polyester is formed by hydroxy acid monomer units and 10–0.1% of diol monomer units.

5. The poly(ester urethane) of claim 1, wherein the polyester comprises structural units derived from hydroxy acid monomers and an organic diol monomer, wherein said hydroxy acid-monomers are formed by aliphatic and/or aromatic hydroxy acid monomers, which are selected from the group consisting of L-lactic acid monomers, D-lactic acid monomers, glycolic acid, α-hydroxyisobutane acid, L-mandelic acid, D-mandelic acid, p-hydroxy benzoic acid and mixtures thereof, the concentration of free hydroxy acid monomers and lactones being at the most 3% of the weight of the polymer.

6. The poly(ester urethane) according to claim 1, wherein the polyester comprises structural units derived from hydroxy acid monomers and an organic diol, wherein the diol monomer is selected from the group consisting of ethylene glycol, 1,4-butanediol, 4,4-isopropylene-diphenol, 2,2-dimethyl-1,3-propanediol, 1,3-propanediol, N,N'bis(salicylinene)-ethylene-diamine, hydroquinone, 4-hydroxybenzyl alcohol, 2-ethyl-1,3-hexanediol, 1,4-dihydroxyanthraquinone, 1,8-dihydroxyanthraquinone, 2,2'-dihydroxybiphenyl, 4,4'-dihydroxybiphenyl, 1,5-dihydroxynaphthacene, 2,7-dihydroxynaphthacene, 1,4-cyclohexanediol, 4-hydroxybenzyl alcohol, dihydroxyacetone, bisphenol A and B and anthrarufin.

7. The poly(ester urethane) according to claim 1, wherein said poly(ester urethane) is hydrolytically degradable, and its number average molar mass is reduced by half at a 37° C. hydrolysis temperature at pH 7 within a maximum of 100 days.

8. The poly(ester urethane) according to claim 1, wherein the viscosity of the polymer melt is 10–5,000 Pa s, as determined by capillary rheometry at a temperature of 200° C. at a shear rate of 200 1/s.

9. Process for preparing a poly(ester urethane), comprising forming a lower molecular weight polyester-prepolymer having a number average molar mass of 1,000 to 8,000 g/mol, wherein 50–99.9% of said lower molecular weight polyester-prepolymer is formed by hydroxy acid monomer units and 50–0.1% of diol monomer units, and copolymerizing the prepolymer with a monomer containing isocyanate groups in order to form a poly(ester urethane), wherein in order to provide the polyester-prepolymer with hydroxyl terminal groups the hydroxy acid monomer is copolymerized with a diol, the hydroxy terminated polyester-prepolymer is copolymerized with diisocyanate at a temperature in the range of about 130° C. to 240° C. for a time period greater then about 30 minutes, and copolymerization is continued until a poly(ester urethane) is achieved which is essentially free from free isocyanate groups.

10. The process according to claim 9, wherein the amount of the diol is 0.1–10% of the amount of the hydroxy acid monomer and the molar ratio of the hydroxyl and carboxy groups of the monomers which are copolymerized is more than 1.

11. The process according to claim 9 or 10, wherein the molar ratio between the isocyanate groups of the diisocyanate and the hydroxyl groups of the polyester is 0.5–1.5.

12. The process according to claim 11, wherein the molar ratio between the isocyanate groups of the diisocyanate and the hydroxyl groups of the polyester is 0.7–1.2, during copolymerization.

13. The process according to claim 11, wherein the molar ratio between the isocyanate groups of the diisocyanate and the hydroxyl groups of the polyester is over 1.

14. The process according to claim 9, wherein the hydroxyl-terminated polyester is copolymerized with diisocyanate at a temperature in the range of about 130 to 220° C.

15. The process according to claim 9, wherein the copolymerization is continued until the molar mass distribution of the copoly(ester urethane) obtained is at least 2, expressed as the ratio $M_w/M_n$.

16. The process according to claim 9, wherein a copoly(ester urethane) is prepared having a multimodal molar mass distribution.

17. The process according to claim 9, wherein the copolymerization is carried out as bulk polymerization in melt phase.

18. The process according to claim 9, wherein the diisocyanate used comprises an aliphatic or alicyclic diisocyanate.

19. The process according to claim 9, wherein the polymerization of the polyester is carried out as bulk polymerization in melt phase, the polymerization temperature being gradually raised within the temperature range of 140 to 200° C. at a rate of 5 to 50° C./h and within the temperature range of 200 to 230° C. at a rate of 0 to 30° C./h.

20. The process according to claim 9, wherein the polyester is produced in the presence of a catalyst, the catalyst used being formed by a catalyst suitable also for the polymerization of the polyurethane.

21. The process according to claim 20, wherein the polyesterification catalyst used comprises tin or an alkyl or alkoxy compound of tin.

22. The process according to claim 9, wherein water formed during the preparation of the polyester as a condensation product is removed by conducting dry inert gas to the polymer melt under stirring.

23. The process according to claim 9 or 22, wherein reduced pressure is used in order to enhance the removal of the water formed as a condensation product during the preparation of the polyester, the reaction pressure being reduced gradually so that the boiling point of the polymer melt is not exceeded at the prevailing reduced pressure.

24. A polymer blend, comprising: a polymer according to claim 1 mixed with a thermoplastic polymer.

25. The polymer blend according to claim 24, wherein the thermoplastic polymer consists of a polyolefin or a polyester.

26. The poly(ester urethane) of claim 1 or the polymer blend of claim 24 blended with fillers or reinforcing agents.

27. An injection moulded piece or thermoformed or blow moulded package, sack, bag, or bottle formed from the polymer of claim 1.

28. A bag, sack, or film made of paper or cardboard coated with the polymer of claim 1.

29. A fiber or fabric comprising the polymer according to claim 1.

30. A coating or a matrix of controllably released fertilizer or medicine comprising the polymer of claim 1.

31. An expanded polymer foam piece comprising the polymer of claim 1.

32. The poly(ester urethane) according to claim 1, wherein the number average molar mass is 15,000–100,000 and the weight average molar mass is 30,000–600,000.

33. The process according to claim 9, wherein the molar ratio between the isocyanate groups of the diisocyanate and the hydroxyl groups of the polyester is about 1 during copolymerization.

34. The process according to claim 9, wherein the molar ratio between the isocyanate groups of the diisocyanate and the hydroxyl groups of the polyester is about 1.2–1.5.

35. The process to according to claim 9, wherein the hydroxyl-terminated polyester is copolymerized with diisocyanate at a temperature in the range of about 150 to 190° C.

36. The process according to claim 9, wherein the diisocyanate used comprises 1,6-hexamethylene diisocyanate or 3-isocyanate-methyl-3,5,5-trimethyl cyclohexyl isocyanate.

37. The poly(ester urethane) according to claim 8, wherein the viscosity of the polymer melt is 50–2,000 Pa s, as determined by capillary rheometry at a temperature of 200° C. at a shear rate of 200 1/s.

38. The process according to claim 20, wherein the polyesterification catalyst used comprises Sn(II) octoate.

39. Process for preparing a poly(ester urethane), comprising:

forming a lower molecular weight polyester-prepolymer from hydroxy acid monomers, and copolymerizing the prepolymer with a monomer containing isocyanate groups in order to form a poly(ester urethane), wherein in order to provide the polyester-prepolymer with hydroxyl terminal groups the hydroxy acid monomer is copolymerized with a diol, the hydroxy terminated polyester-prepolymer is copolymerized with diisocyanate at a temperature in the range of about 130° C. to 240° C. for a time period greater than about 30 minutes, and copolymerization is continued until a poly(ester urethane) is achieved which is essentially free from free isocyanate groups, wherein the number average molar mass of the prepolymer is 1,000 to 8,000 g/mol, the amount of the diol is 0.1 to 10% of the amount of the hydroxy acid monomer, the molar ratio of the isocyanate groups of the diisocyanate to the hydroxyl groups of the polyester is 0.7 to 1.2, and a long-chain branched poly(ester urethane) is produced having a number average molar mass of 15,000 to 100,000, a weight average molar mass of 45,000 to 600,000 and a molar mass distribution of 3 to 12.

40. The process for preparing a poly(ester urethane) according to claim 39, wherein the copolymerization with the diisocyanate compound is continued until at least 99% of the diisocyanate compounds have reacted.

* * * * *

UNITED STATES PATENT AND TRADEMARK OFFICE
CERTIFICATE OF CORRECTION

PATENT NO. : 6,087,465

DATED : July 11, 2000

INVENTOR(S) : Jukka Seppälä, et al.

It is certified that error appears in the above-identified patent and that said Letters Patent is hereby corrected as shown below:

Column 1, under the title, insert "This application is the national phase under 35 U.S.C. §371 of PCT International Application No. PCT/FI95/00396 which has an International filing date of July 7, 1995 which designated the United States of America.--

Signed and Sealed this

Twenty-seventh Day of March, 2001

*Attest:*

NICHOLAS P. GODICI

*Attesting Officer*

Acting Director of the United States Patent and Trademark Office